(12) United States Patent
Matsuzaka

(10) Patent No.: US 7,768,674 B2
(45) Date of Patent: Aug. 3, 2010

(54) EXPOSURE DETERMINING DEVICE AND EXPOSURE DETERMINING METHOD

(75) Inventor: Kenji Matsuzaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 676 days.

(21) Appl. No.: 11/709,461

(22) Filed: Feb. 21, 2007

(65) Prior Publication Data

US 2007/0195385 A1    Aug. 23, 2007

(30) Foreign Application Priority Data

Feb. 21, 2006 (JP) ............................. 2006-043719
Nov. 15, 2006 (JP) ............................. 2006-309406

(51) Int. Cl.
*H04N 1/40* (2006.01)
(52) U.S. Cl. ..................... 358/3.21; 382/273
(58) Field of Classification Search ................. 358/1.9, 358/2.1, 3.21, 453, 461, 468, 519–522, 527, 358/538; 382/273–274
See application file for complete search history.

(56) References Cited

U.S. PATENT DOCUMENTS 4,929,824 A * 5/1990 Miyazaki .................... 382/274

6,694,051 B1 * 2/2004 Yamazoe et al. ............ 382/167

FOREIGN PATENT DOCUMENTS

| JP | 09-068764 | 3/1997 |
| JP | 2002-281337 | 9/2002 |
| JP | 2004297128 A * | 10/2004 |

* cited by examiner

*Primary Examiner*—Thomas D Lee
*Assistant Examiner*—Stephen M Brinich
(74) *Attorney, Agent, or Firm*—Nutter McClennen & Fisher LLP; John J. Penny, Jr.; Michael P. Visconti, III

(57) ABSTRACT

There is provided an exposure determining device that determines whether exposure of an image represented by image data is appropriate. The exposure determining device includes a first evaluation value deriving unit that derives a maximum luminance reference value for each of blocks obtained by dividing the image into a plurality of blocks of the image data on the basis of luminance values of pixels constituting each block, and derives a first evaluation value for the image on the basis of the derived maximum luminance reference values for the blocks, and an exposure determining unit that determines whether exposure of the image is appropriate, on the basis of the derived first evaluation value.

15 Claims, 16 Drawing Sheets

| Bmax (1, 1) | Bmax (1, 2) | Bmax (1, 3) | Bmax (1, 4) | Bmax (1, 5) |
|---|---|---|---|---|
| Bmax (2, 1) | Bmax (2, 2) | Bmax (2, 3) | Bmax (2, 4) | Bmax (2, 5) |
| Bmax (3, 1) | Bmax (3, 2) | Bmax (3, 3) | Bmax (3, 4) | Bmax (3, 5) |
| Bmax (4, 1) | Bmax (4, 2) | Bmax (4, 3) | Bmax (4, 4) | Bmax (4, 5) |
| Bmax (5, 1) | Bmax (5, 2) | Bmax (5, 3) | Bmax (5, 4) | Bmax (5, 5) |

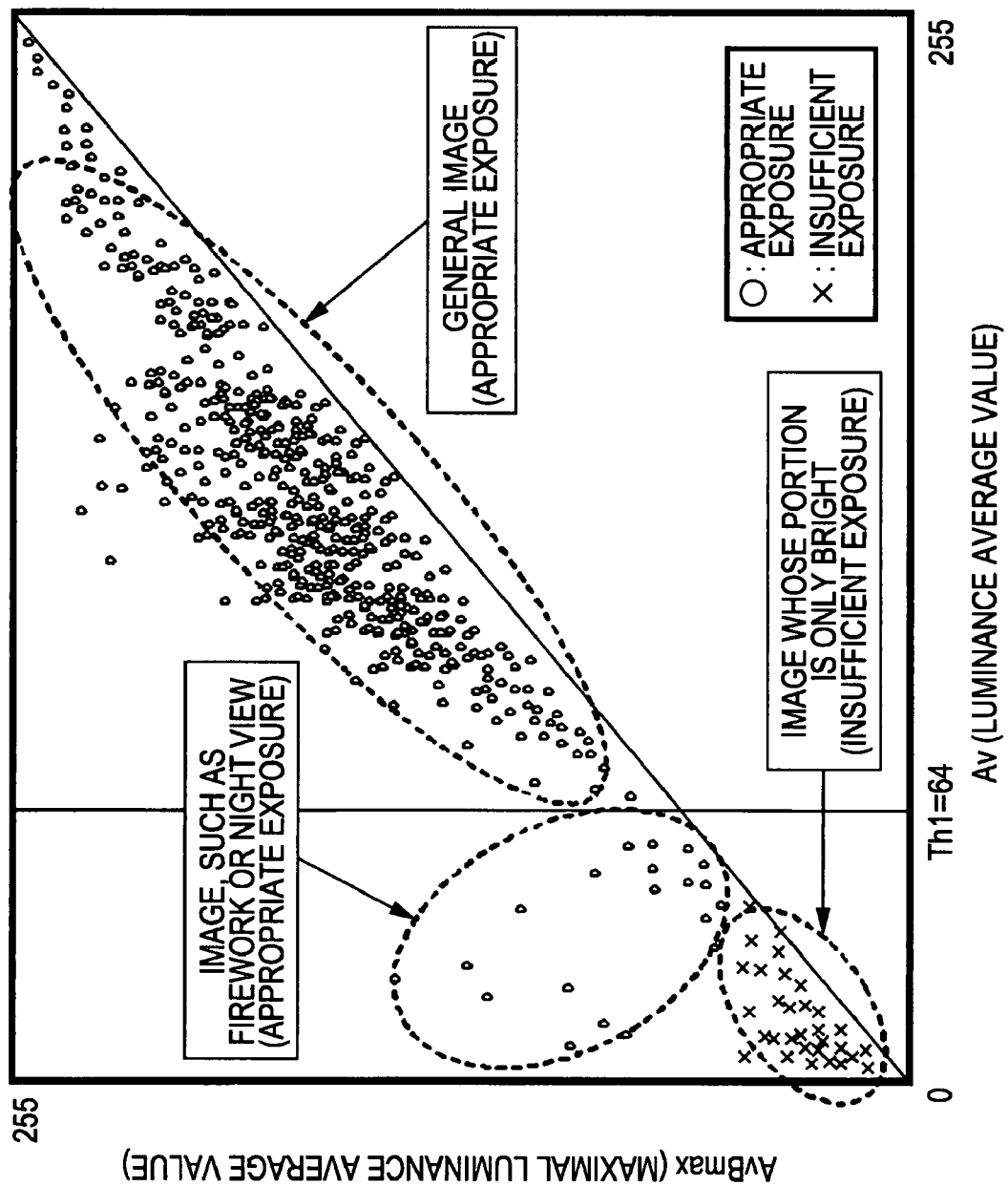

FIG. 14A

EVALUATIVE PHOTOMETRY

| 0 | 1 | 1 | 1 | 0 |
|---|---|---|---|---|
| 1 | 1 | 1 | 1 | 1 |
| 1 | 1 | 1 | 1 | 1 |
| 1 | 1 | 1 | 1 | 1 |
| 0 | 1 | 1 | 1 | 0 |

FIG. 14B

CENTRALLY WEIGHTED PHOTOMETRY

| 0 | 1 | 1 | 1 | 0 |
|---|---|---|---|---|
| 1 | 2 | 3 | 2 | 1 |
| 1 | 3 | 5 | 3 | 1 |
| 1 | 2 | 3 | 2 | 1 |
| 0 | 1 | 1 | 1 | 0 |

EXPOSURE DETERMINING DEVICE AND EXPOSURE DETERMINING METHOD

BACKGROUND

1. Technical Field

The present invention relates to an exposure determining device and an exposure determining method that are capable of determining whether exposure of an image represented by image data is appropriate.

2. Related Art

When images (photographic images) captured by a digital camera or the like are printed by using a printer or a multi-function machine, printing all the photographed images is very wasteful. That is, since it is likely that the photographed images include images where exposure is insufficient, it is wasteful to print the images where exposure is insufficient.

FIGS. 15A and 15B illustrate examples of an image where exposure is appropriate and an image where exposure is insufficient. FIG. 15A illustrates an image obtained by photographing a firework rising toward a night sky, which illustrates an image where even though a background is dark, since bright portions are scattered over the entire image, exposure is appropriate, and the image is suitable for printing. In contrast, FIG. 15B illustrates an image where even though a portion of the image is only bright, since the other portions are dark, exposure is insufficient, and the image is not suitable for printing.

As such, generally, for some images, such as an image that is obtained by photographing a firework or night view, exposure may be appropriate, while for other images where a portion thereof is bright but the other portions are dark, exposure may be insufficient.

Accordingly, if images where exposure is appropriate can be determined from among a plurality of captured images, only images a user wants to print can be printed.

Meanwhile, as a method of determining whether exposure of an image is excessive or insufficient, for example, methods disclosed in JP-A-9-68764 and JP-A-2002-281337 are known.

Specifically, with respect to an image for which exposure is to be determined, an average value of luminance values of pixels of the image is calculated and it is determined whether exposure of the image is excessive or insufficient, on the basis of the average value.

However, as described above, in the case where with respect to an image for which exposure is to be determined, an average value (hereinafter, also referred to as average luminance value) of luminance values of pixels of the image is calculated and it is determined on the basis of the average value whether exposure of the image is appropriate or insufficient, an erroneous determination may be performed for each image.

FIGS. 16A and 16B are diagrams illustrating a histogram of luminance values and an average luminance value for each of images shown in FIGS. 15A and 15B. Specifically, FIG. 16A shows a histogram of luminance values for an image shown in FIG. 15A where exposure is appropriate, and FIG. 16B shows a histogram of luminance values for an image shown in FIG. 15B where exposure is insufficient. In each of FIGS. 16A and 16B, reference character Av indicates an average value of luminance values (average luminance value) of pixels of the image.

As shown in FIGS. 16A and 16B, if an average luminance value Av of pixels of an image shown in FIG. 15A where exposure is appropriate is compared with an average luminance value Av of pixels of an image shown in FIG. 15B where exposure is insufficient, the respective average luminance values Av are substantially the same. Accordingly, it can be understood that if the average luminance values Av are only used, it is difficult to determine that the image shown in FIG. 15A is an image where exposure is appropriate and the image shown in FIG. 15B is an image where exposure is insufficient.

SUMMARY

An advantage of some aspects of the invention is that it provides an exposure determining device and an exposure determining method that are capable of reliably determining whether exposure of an image is appropriate.

According to an aspect of the invention, there is provided an exposure determining device that determines whether exposure of an image represented by image data is appropriate. The exposure determining device includes a first evaluation value deriving unit that derives a maximum luminance reference value for each of blocks obtained by dividing the image into a plurality of blocks of the image data on the basis of luminance values of pixels constituting each block, and derives a first evaluation value for the image on the basis of the derived maximum luminance reference values for the blocks, and an exposure determining unit that determines whether exposure of the image is appropriate, on the basis of the derived first evaluation value.

According to this structure, the maximum luminance reference value for each of blocks obtained by dividing the image into a plurality of blocks is derived from luminance values of pixels constituting each block, the first evaluation value for the image is derived from the derived maximum luminance reference value for each block, and it is determined whether exposure of the image is appropriate, on the basis of the derived first evaluation value. In this case, the maximum luminance reference value includes not only the maximum luminance value but also a value proportional to the maximum luminance value, for example, the n-th large value from among luminance values of pixels, or a value of a histogram accumulation m % from a lager side.

Accordingly, in regards to the image that is obtained by photographing the firework or night view, that is, the image where a background is dark, but bright portions are scattered over the entire image, a predetermined value can be obtained as the maximum luminance reference value for each block. The first evaluation value that is derived from the maximum luminance reference value is used as an exposure determining index, and thus it is possible to determine whether the image is an image where exposure is appropriate. In contrast, in regards to the image where a portion is bright and the other portions are dark, a large value can be only obtained as a maximum luminance reference value for a portion of blocks. Therefore, the first evaluation value that is derived from the maximum luminance reference value is used as an exposure determining index, and thus it is possible to determine whether the image is an image where exposure is insufficient.

In the exposure determining device according to the aspect of the invention, the first evaluation value that is derived from the maximum luminance reference value for each block in the image is used as an exposure determining index. Therefore, it is possible to reliably determine whether exposure of the image is appropriate.

Preferably, the first evaluation value for the image is an average value of the maximum luminance reference values for the individual blocks, and the exposure determining unit determines that exposure of the image is appropriate, when the first evaluation value exceeds a first threshold value.

As such, the average value of the maximum luminance reference values for the individual blocks is used as the first evaluation value. Therefore, it is possible to reliably determine whether exposure of the image is appropriate, without complicating a calculation process.

Preferably, the exposure determining device further includes a second evaluation value deriving unit that derives a characteristic value of the image as a second evaluation value for the image on the basis of the image data. The exposure determining unit determines whether exposure of the image is appropriate, on the basis of the derived first evaluation value and the derived second evaluation value.

As such, the first evaluation value derived from the maximum luminance reference value and the second evaluation value as the characteristic value of the image are used as the exposure determining index. Therefore, it is possible to reliably determine whether image of the image is appropriate.

Preferably, the exposure determining unit determines whether exposure of the image is appropriate, on the basis of the derived second evaluation value, as a first determining step, and determines whether exposure of the image is appropriate, on the basis of the derived first evaluation value, as a second determining step, when it is determined in the first determining step that exposure of the image is not appropriate, and the first evaluation value deriving unit performs derivation of the first evaluation value on the basis of the image data, when it is determined by the exposure determining unit in the first determining step that exposure of the image is not appropriate.

According to this structure, the first evaluation value deriving unit only performs derivation of the first evaluation value, when it is determined in the first determining step that exposure of the image is not appropriate, that is, exposure of the image is insufficient, and does not perform derivation of the first evaluation value, when it is determined in the first determining step that exposure of the image is appropriate. Therefore, it is possible to shorten the processing time.

Preferably, the first evaluation value for the image is an average value of the maximum luminance reference values for the individual blocks, the characteristic value of the image is an average value of luminance values of pixels that constitute the image, and the exposure determining unit determines that exposure of the image is appropriate when it is determined in the first determining step that the second evaluation value exceeds a second threshold value, determines that exposure of the image is not appropriate when it is determined in the first determining step that the second evaluation does not exceed the second threshold value, and determines that exposure of the image is appropriate when it is determined in the second determining step that the first evaluation value exceeds a first threshold value.

According to this structure, the processing time can be shortened, and it is possible to reliably determine whether exposure of the image is appropriate.

Preferably, the exposure determining unit determines whether exposure of the image is appropriate, on the basis of a threshold value function formula using first and second evaluation values as variables.

According to this structure, it is possible to reliably determine whether exposure of the image is appropriate.

Preferably, the first evaluation value for the image is an average value of the maximum luminance reference values for the individual blocks, the characteristic value of the image is an average value of luminance values of pixels that constitute the image, when an average value of maximum luminance reference values for the individual blocks is defined as AvRmax, an average value of luminance values of pixels is defined as Av, and constant numbers are defined as a and b (a and b are positive numbers), the threshold value function formula is represented by Equation AvRmax>−a·Av+b, and when the threshold value function formula is satisfied, it is determined that exposure of the image is appropriate.

According to this structure, it is possible to determine whether exposure of the image is appropriate, with high precision.

Preferably, the average value of the maximum luminance reference values for the individual blocks is an average value of values that are obtained by weighting the maximum luminance reference values for the individual blocks.

According to this structure, it is possible to reliably determine whether exposure of the image is appropriate in a state where characteristics of the image are added.

Preferably, when the image is an image that is photographed in predetermined photometry, weighting values for the individual blocks are set according to the predetermined photometry.

According to this structure, it is possible to reliably determine whether exposure of the image is appropriate in a state where conditions at the time of photographing are added.

Preferably, when the image is a JPEG (Joint Photographic Experts Group) image that is compressed in a format of JPEG, an average value of the luminance values of pixels is calculated as an average value of DC components of a discrete cosine transform (DCT) that is obtained for each block of 8×8 pixels in the JPEG image.

According to this structure, the processing time can be drastically shortened, as compared with the case where an average value of luminance values for each pixel is calculated on the entire image.

Preferably, the maximum luminance reference value for each block is a maximum luminance value from among the luminance values of pixels that constitute each block.

In this case, since the maximum luminance value can be easily obtained, the processing time can be shortened.

Preferably, when a thumbnail image for the image exists, it is determined whether exposure of the thumbnail image is appropriate, by using the thumbnail image instead of the image, and when it is determined that exposure of the thumbnail image is appropriate, it is also determined that exposure of the image is appropriate.

In this case, the size of the thumbnail image is smaller than the size of the main image. Therefore, when the thumbnail image is used instead of the main image, a process load can be reduced, and the processing time can be drastically shortened.

Further, the invention is not limited to an aspect of a device invention such as the above-described exposure determining device, but may be implemented as an aspect of a method invention such as an exposure determining method. Further, the invention may be implemented as various aspects including an aspect as a computer program for constructing the method or device, and an aspect as a recording medium where the computer program is recorded.

BRIEF DESCRIPTION OF THE DRAWINGS

The invention will be described with reference to the accompanying drawings, wherein like numbers reference like elements.

FIG. 3 is a schematic view illustrating calculation of a maximum luminance value Bmax for each block according to an aspect of the invention.

FIG. 5 is a graph illustrating a distribution of an average luminance value and a maximum average luminance value for a plurality of images together with a threshold value for an average luminance value.

FIGS. 14A and 14B are diagrams illustrating examples of photometry.

DESCRIPTION OF EXEMPLARY EMBODIMENTS

Hereinafter, the preferred embodiments of the invention will be described in the following order: First Embodiment, Structure of Embodiment, Operation of Embodiment, Effect of Embodiment, Second Embodiment, Structure of Embodiment, Operation of Embodiment, Effect of Embodiment, Third Embodiment, Structure of Embodiment, Operation of Embodiment, Effect of Embodiment, Fourth Embodiment, Structure of Embodiment, Operation of Embodiment, Effect of Embodiment, and Modification.

First Embodiment

Structure of Embodiment

Figure 1:
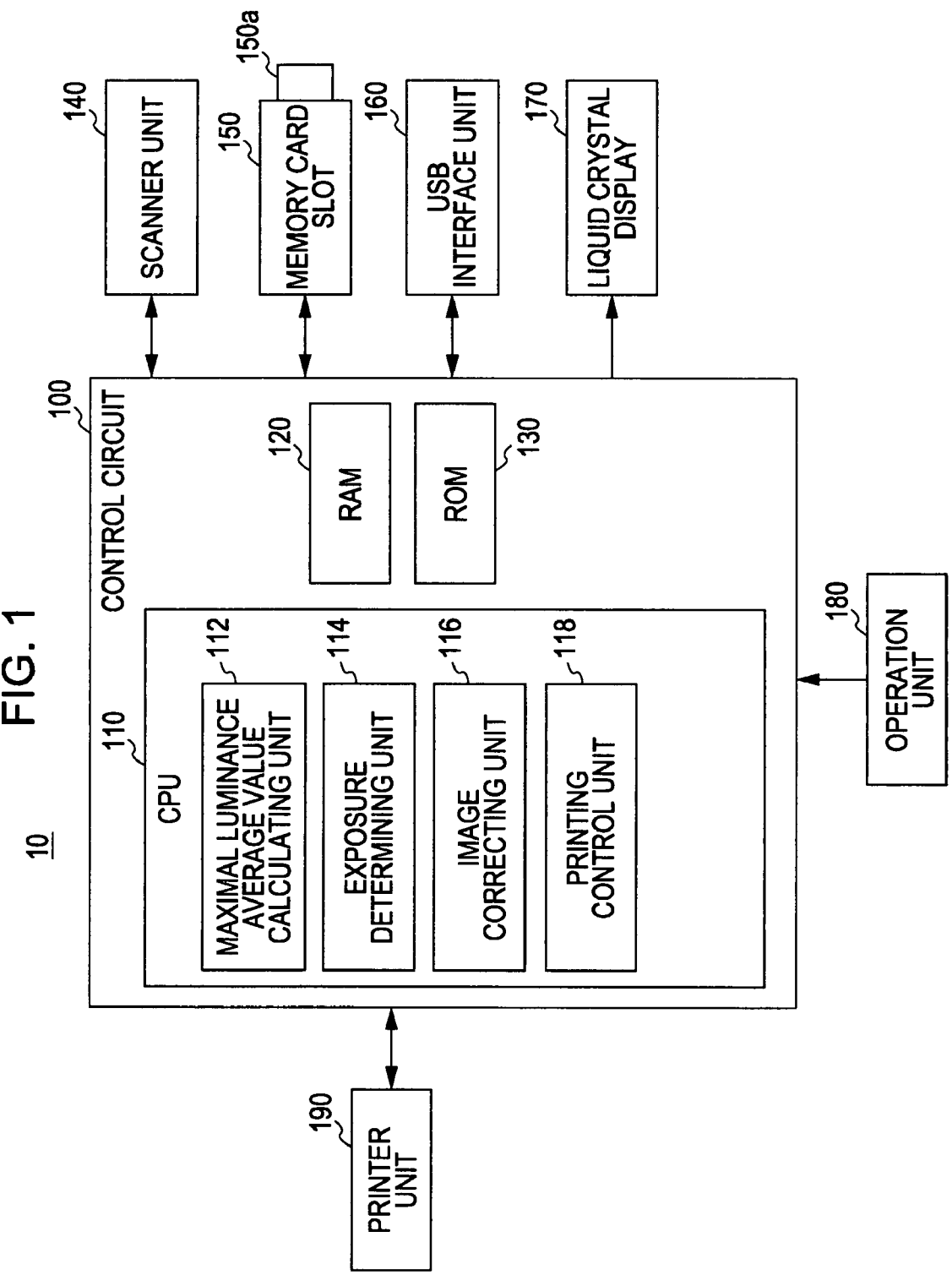
FIG. 1 is a block diagram illustrating a multifunction machine that includes an exposure determining device according to a first embodiment of the invention.

FIG. 1 is a block diagram illustrating a multifunction machine that includes an exposure determining device according to a first embodiment of the invention. A multifunction machine 10 shown in FIG. 1 includes a control circuit 100 that functions as an exposure determining device and controls various constituent elements to be described below, a scanner unit 140 that reads out an image from a photograph or the like and converts the image into image data, a memory card slot 150 that reads the image data from or writes the image data to the a memory card 150a to be inserted into the memory card slot 150, an USB interface unit 160 that is connected to a digital camera (not shown) or the like through a USB cable (not shown) and reads or writes image data or the like, a liquid crystal display 170 that displays images or various messages, an operation unit 180 that receives various instructions from a user, and a printer unit 190 that prints an image on paper or the like on the basis of the image data.

Among the above-described various constituent elements, the control circuit 100 includes a CPU 110 that performs various processes or control in accordance with computer programs, a RAM 120 that temporarily stores data or the like that is obtained during a process or control by the CPU 110, and a ROM 130 that stores the computer programs used in the CPU 110. Further, the CPU 110 executes the computer programs, and functions as a maximum average luminance value calculating unit 112, an exposure determining unit 114, an image correcting unit 116, or a printing control unit 118. In particular, the maximum average luminance value calculating unit 112 and the exposure determining unit 114 form an exposure determining device.

In FIG. 1, the maximum average luminance value calculating unit 112 corresponds to a first evaluation value deriving unit according to aspects of the invention, and the exposure determining unit 14 corresponds to an exposure determining unit according to the aspects of the invention.

Operation of Embodiment

The operation of this embodiment will be described for a case where a user instructs the multifunction machine 10 shown in FIG. 1 to perform 'entrusted printing' of all the image data written in the memory card 150a.

In this case, the term 'entrusted printing' means that the multifunction machine 10 automatically selects some of images suitable for printing from among a plurality of images and prints the selected images. In order to perform the 'entrusted printing', when the images suitable for printing are selected, an image determining process using an exposure determining device according to this embodiment is performed.

Figure 2:
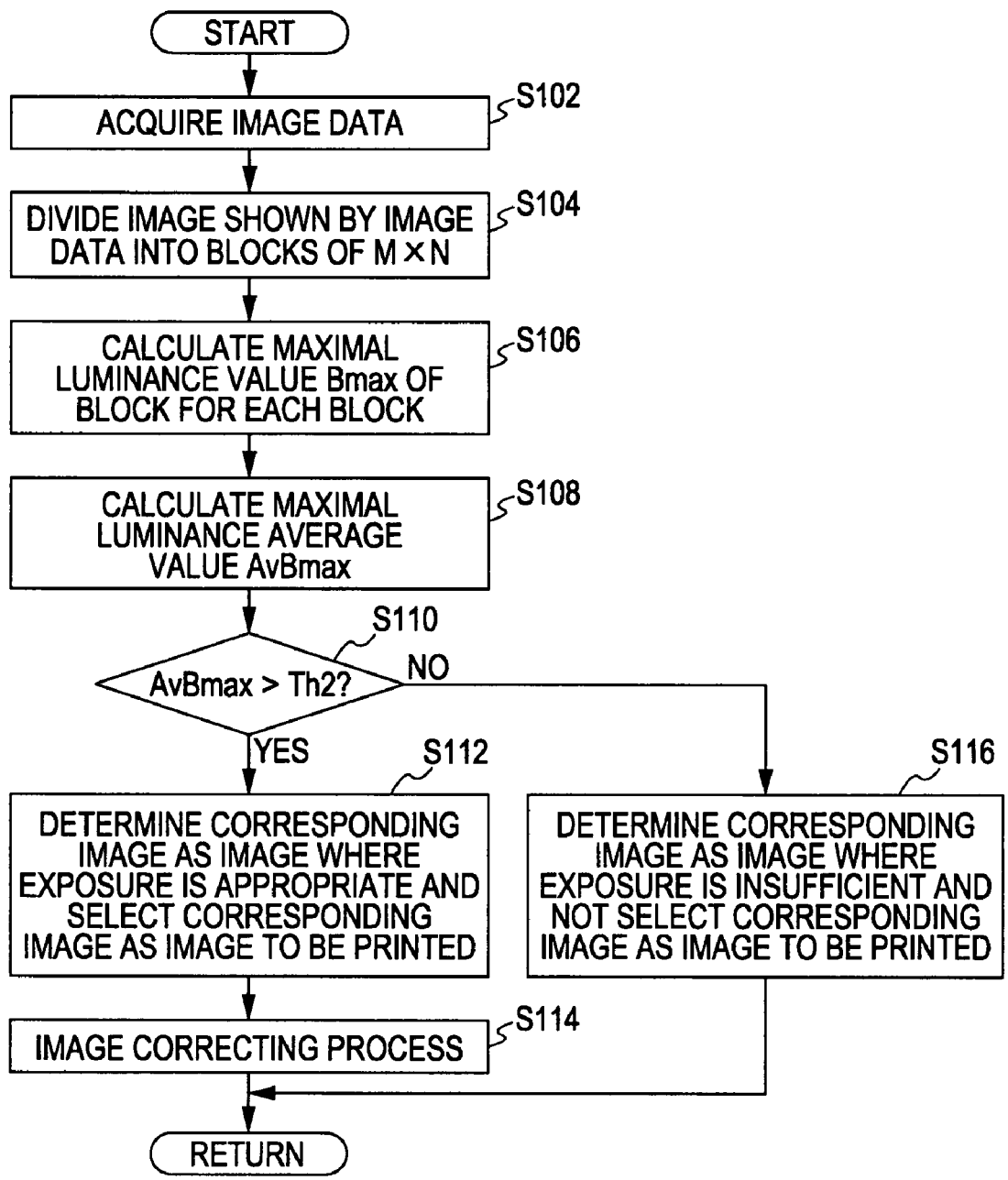
FIG. 2 is a flowchart illustrating a process flow of an exposure determining process routine according to a first embodiment of the invention.

FIG. 2 is a flowchart illustrating a process flow of an exposure determining process routine according to a first embodiment of the invention.

If the user instructs the multifunction machine 10 to perform the 'entrusted printing' on all the image data written in the memory card 150a through the operation unit 180, the CPU 110 sequentially executes the exposure determining process routine shown in FIG. 2 for all the image data.

When the exposure determining process routine shown in FIG. 2 starts, first, the maximum average luminance value calculating unit 112 that is controlled by the CPU 110 accesses the memory card 150a through the memory card slot 150, reads and acquires image data representing one image from among image data representing a plurality of images written in the memory card 150a, and writes the read image data to the RAM 120 (Step S102). Then, the maximum average luminance value calculating unit 112 divides the image represented by the image data into M×N blocks (each of M and N is an integer of 1 or more) (Step S104). Specifically, a size or location of each block is calculated from the image data. Then, on the basis of the image data, the maximum average luminance value calculating unit 112 calculates a maximum luminance value Bmax in each block from luminance values of pixels constituting the block (Step S106).

FIG. 3 is a schematic view illustrating calculation of a maximum luminance value Bmax for each block according to an aspect of the invention. In an example shown in FIG. 3, a maximum luminance value Bmax (m, n) is calculated for each of 5×5 blocks, that is, a total of 25 blocks (m is a natural number in a range of 1 to 5 and n is a natural number in a range of 1 to 5).

Then, the maximum average luminance value calculating unit 112 calculates an average value of the maximum luminance values Bmax calculated for the blocks, and thereby determines a maximum average luminance value AvBmax (Step S108).

For example, in the case shown in FIG. 3, the maximum average luminance value AvBmax is calculated by Equation 1.

$$AvB\max = \frac{\sum_{i=1,j=1}^{5,5} B\max(i,j)}{5 \times 5} \quad (1)$$

Then, the exposure determining unit 114 controlled by the CPU 110 determines whether the calculated maximum average luminance value AvBmax exceeds a predetermined threshold value Th2 (Step S110). At this time, when it is determined that the calculated maximum average luminance value AvBmax exceeds the predetermined threshold value Th2, the exposure determining unit 114 determines the image as an image where exposure is appropriate, and selects the image as an image to be printed (Step S112). Then, the image correcting unit 116 that is controlled by the CPU 110 performs on the image selected as an image to be printed, an image correcting process including various image quality corrections, such as contrast, brightness, a color balance, noise elimination, or the like (Step S114), and completes the exposure determining process routine. In contrast, when it is determined that the calculated maximum average luminance value AvBmax does not exceed the predetermined threshold value Th2, the exposure determining unit 114 determines tat the image is an image where exposure is insufficient and does not select the image as an image to be printed (Step S116), and completes the exposure determining process routine.

In this way, the CPU 110 sequentially executes the exposure determining process routine shown in FIG. 2 for all the image data written in the memory card 150a, discriminates images represented by image data into images to be printed and images not to be printed according to whether each image is an image where exposure is appropriate or an image where exposure is insufficient, and executes a desired image correcting process on the images to be printed.

Then, the printing control unit 118 that is controlled by the CPU 110 controls the printer unit 190 and allows the printer unit 190 to sequentially print the images to be printed, the images having been subjected to an image correcting process.

As described above, some of images, which are suitable, for printing and whose exposure is appropriate, are automatically selected from among a plurality of images written in the memory card 150a, and the selected images can be printed.

Effect of Embodiment

Figure 4A:
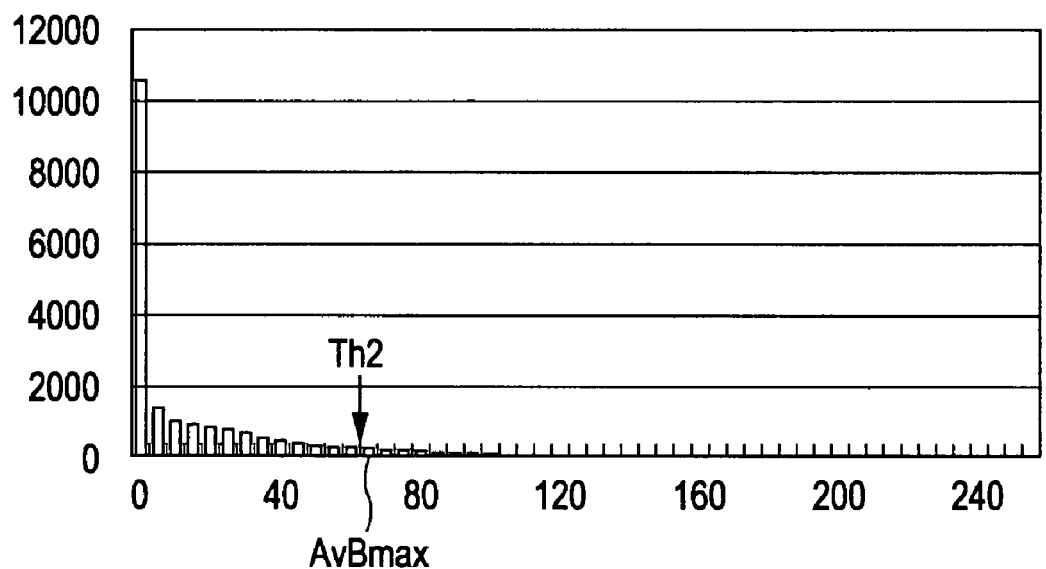
FIGS. 4A and 4B are diagrams illustrating a histogram of luminance values and a maximum average luminance value for each image shown in FIGS. 15A and 15B.
Figure 4B:
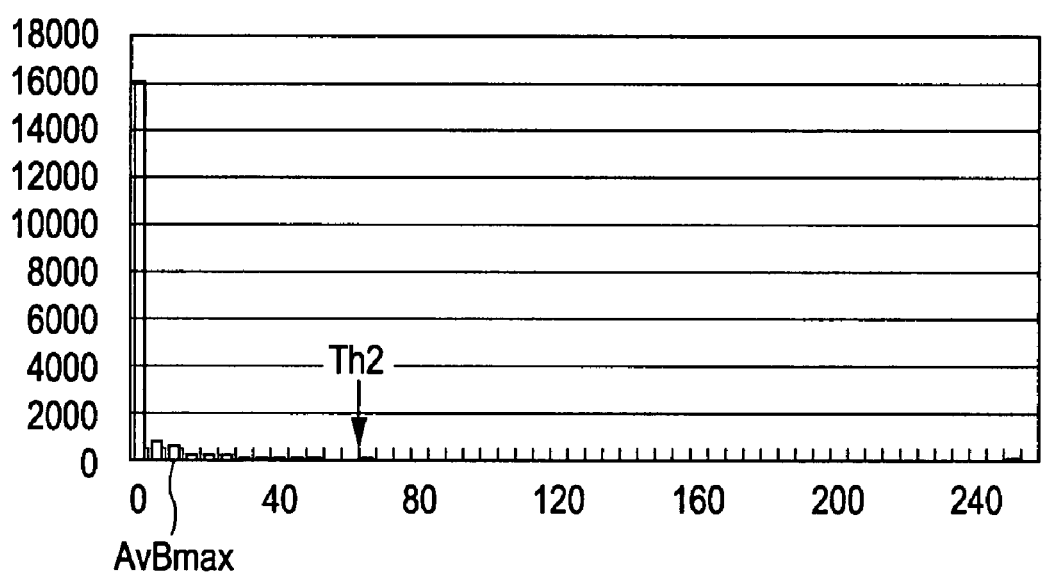
Figure 15A:
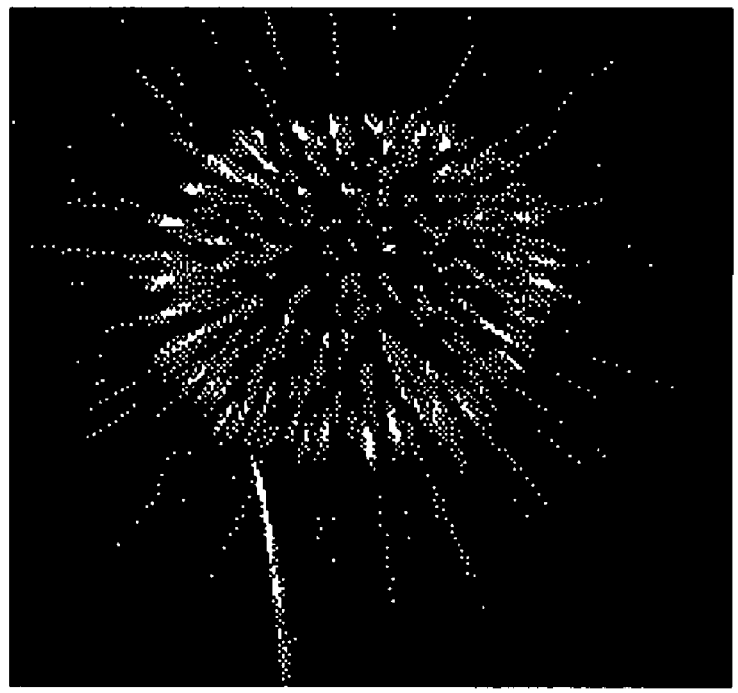
FIGS. 15A and 15B are diagrams illustrating examples of an image where exposure is appropriate and an image where exposure is insufficient.
Figure 15B:
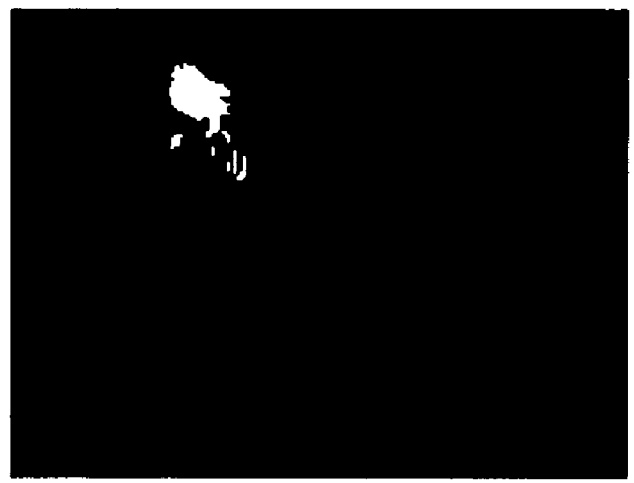
Figure 16A:
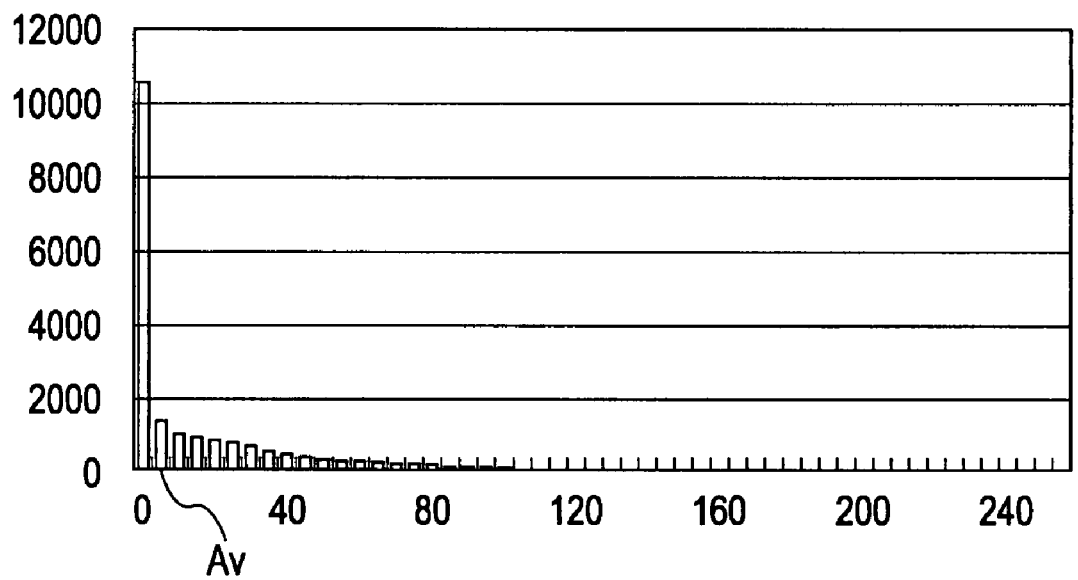
FIGS. 16A and 16B are diagrams illustrating a histogram of luminance values and an average luminance value for each image shown in FIGS. 15A and 15B.
Figure 16B:
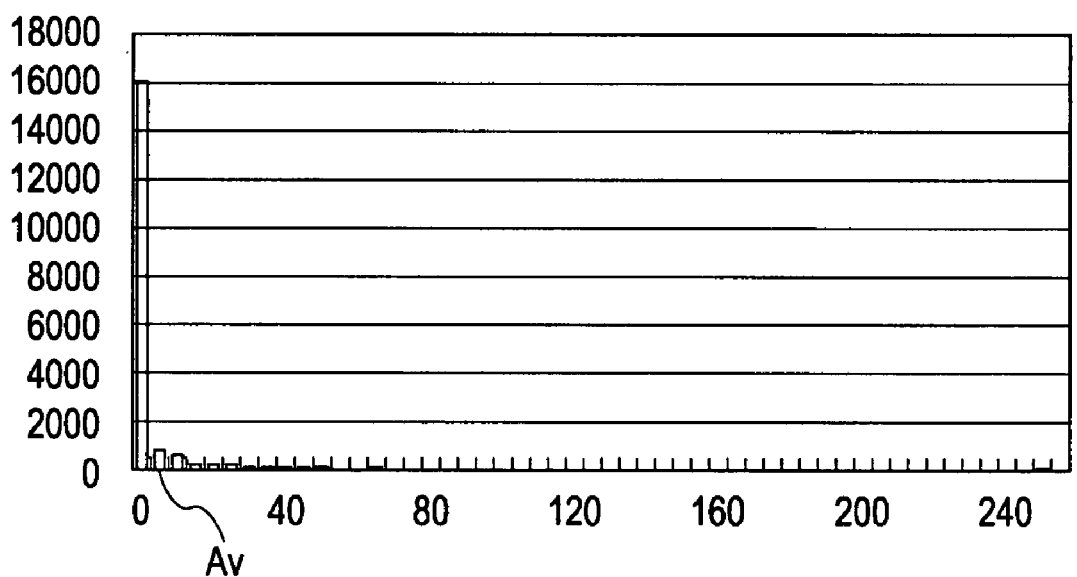

FIGS. 4A and 4B are diagrams illustrating a histogram of luminance values and a maximum average luminance value for each image shown in FIGS. 15A and 15B. Similar to FIGS. 16A and 16B, FIG. 4A shows a histogram for an image shown by FIG. 15A where exposure is appropriate, and FIG. 4B is a histogram for an image shown by FIG. 15B where exposure is insufficient. In FIGS. 4A and 4B, reference character AvBmax indicates a maximum average luminance value in an image.

As shown in FIGS. 4A and 4B, in an image shown by FIG. 15A where exposure is appropriate, the maximum average luminance value AvBmax exceeds a threshold value Th2. In contrast, in an image shown by FIG. 15B where exposure is insufficient, the maximum average luminance value AvBmax is less than the threshold value Th2. Accordingly, if a maximum average luminance value AvBmax which is an average value of the maximum luminance values for the individual blocks constituting the image is used as an exposure determining index, it is possible to reliably determine that the image shown in FIG. 15A is an image where exposure is appropriate and that the image shown in FIG. 15B is an image where exposure is insufficient.

Figure 6:
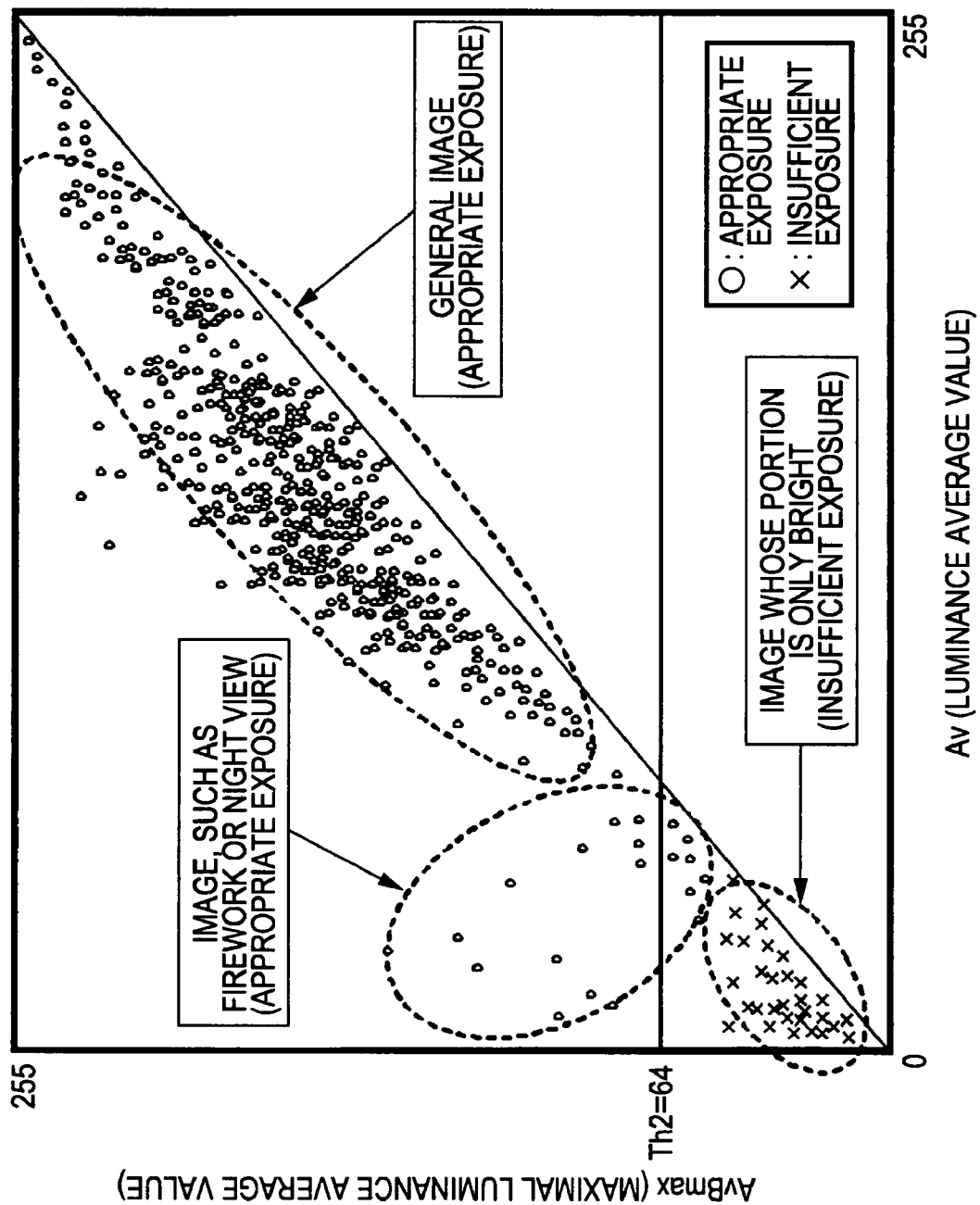
FIG. 6 is a graph illustrating a distribution of an average luminance value and a maximum average luminance value for a plurality of images together with a threshold value for a maximum average luminance value.

FIG. 5 is a graph illustrating a distribution of an average luminance value and a maximum average luminance value for a plurality of images together with a threshold value for an average luminance value. FIG. 6 is a graph illustrating a distribution of an average luminance value and a maximum average luminance value for a plurality of images together with a threshold value for a maximum average luminance value. In FIGS. 5 and 6, a horizontal axis indicates an average luminance value Av and a longitudinal axis indicates a maximum average luminance value AvBmax, and both the average luminance value Av and the maximum average luminance value AvBmax are in a range of 0 to 255. Further, since the relationship AvBmax≧Av holds for the maximum average luminance value AvBmax and the average luminance value Av, each image is located above a straight line of AvBmax=Av in the graph. At this time, reference symbol ○ indicates an image where exposure is appropriate, and reference symbol x indicates an image where exposure is insufficient. Further, groups of images that are located in the central and at the upper right are normal images, a group of images that is located at the lower left is represented by an image shown by FIG. 15B where a portion of the image is bright and the other portion is dark. Groups of images that are located between the above-described groups of images are represented by an image shown by FIG. 15A obtained by photographing a firework or a night view.

As described above, the average luminance value Av of the image is generally used as an exposure determining index. For example, as shown in FIG. 5, if a threshold value Th1 with respect to the average luminance value Av is set to '64', it is possible to determine that a normal image is an image where exposure is appropriate, and to determine that an image where only one portion thereof is bright is an image where exposure is insufficient. However, although an image of a firework or night view needs to be determined as an image where exposure is appropriate, an image of a firework or night view may be erroneously determined as an image where exposure is insufficient.

Meanwhile, as described above, in this embodiment, the maximum average luminance value AvBmax of the image is used as an exposure determining index. For example, as shown in FIG. 6, if a threshold value Th2 with respect to the maximum average luminance value AvBmax is set to '64', it is possible to determine that most images including images of a firework or night view as well as the normal images are images where exposure is appropriate. Further, it is possible to determine that all images where only one portion thereof is bright are images where exposure is insufficient.

As described above, according to this embodiment, the maximum average luminance value AvBmax of an image is used as an exposure determining index, thereby enabling whether exposure of an image is appropriate to be reliably determined.

Second Embodiment

Structure of Embodiment

Figure 7:
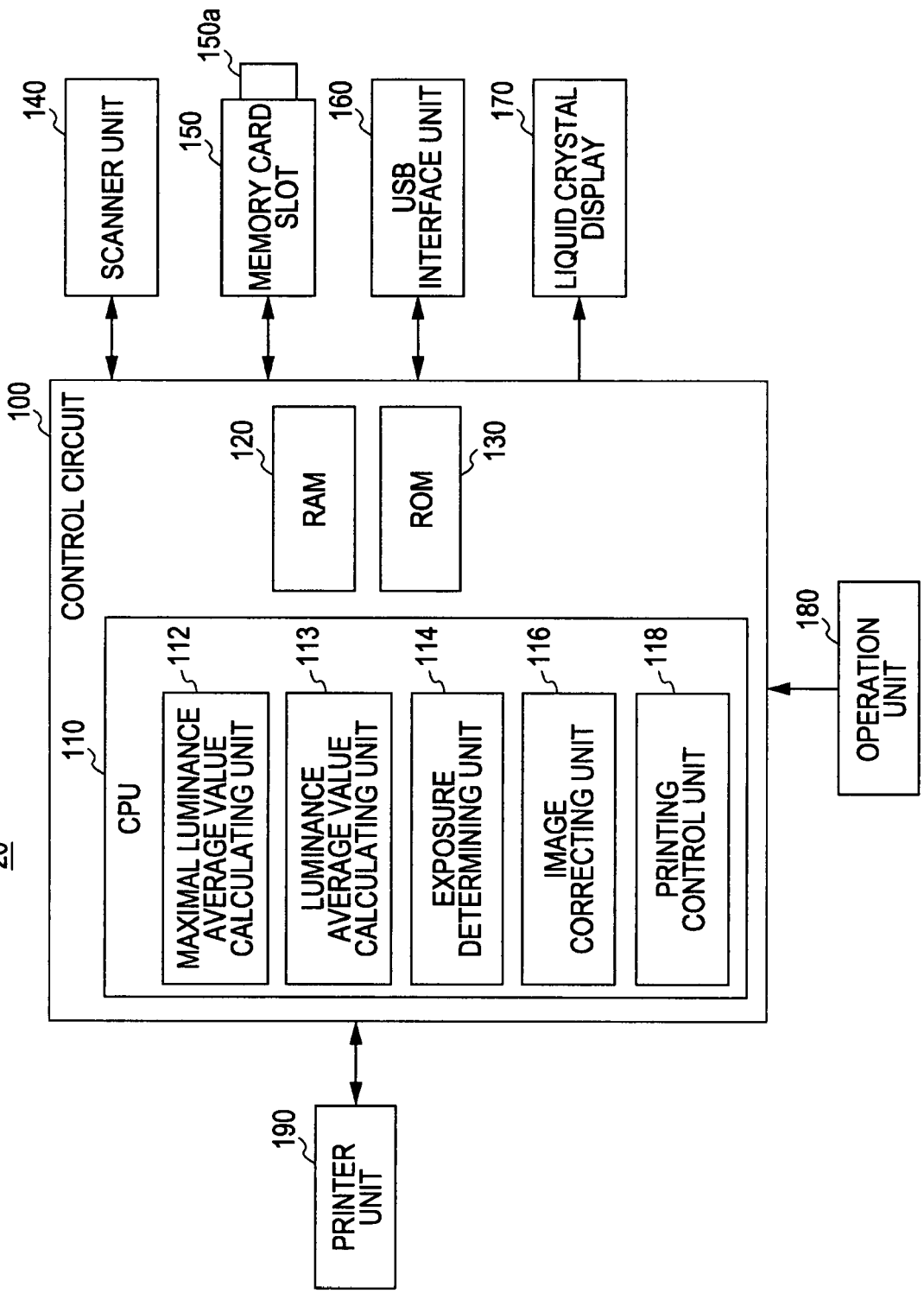
FIG. 7 is a block diagram illustrating a multifunction machine that includes an exposure determining device according to a second embodiment of the invention.

FIG. 7 is a block diagram illustrating a multifunction machine that includes an exposure determining device according to a second embodiment of the invention. A multifunction machine 20 shown in FIG. 7 is different from the multifunction machine 10 shown in FIG. 1 in that the CPU 110 executes computer programs and controls as not only the maximum average luminance value calculating unit 112, the exposure determining unit 114, the image correcting unit 116, and the printing control unit 118 but also an average luminance value calculating unit 113. Since the other structure is the same as that of the multifunction machine 10 shown in FIG. 1, the description thereof will be omitted.

In FIG. 7, the maximum average luminance value calculating unit 112 corresponds to a first evaluation value deriving unit according to the aspect of the invention, the average luminance value calculating unit 113 corresponds to a second evaluation value deriving unit according to the aspects of the invention, and the exposure determining unit 114 corresponds to an exposure determining unit according to the aspects of the invention.

Operation of Embodiment

The operation of this embodiment will be described for a case where a user instructs the multifunction machine 20 shown in FIG. 7 to perform 'entrusted printing' of all the image data written in the memory card 150a, similar to the case of the first embodiment.

The operation of the second embodiment is different from the operation of the first embodiment in that an exposure determining process is performed by using the average luminance value Av as an exposure determining index in a first determining step, and an exposure determining process is performed by using the maximum average luminance value AvBmax as an exposure determining index in a second determining step.

Figure 8:
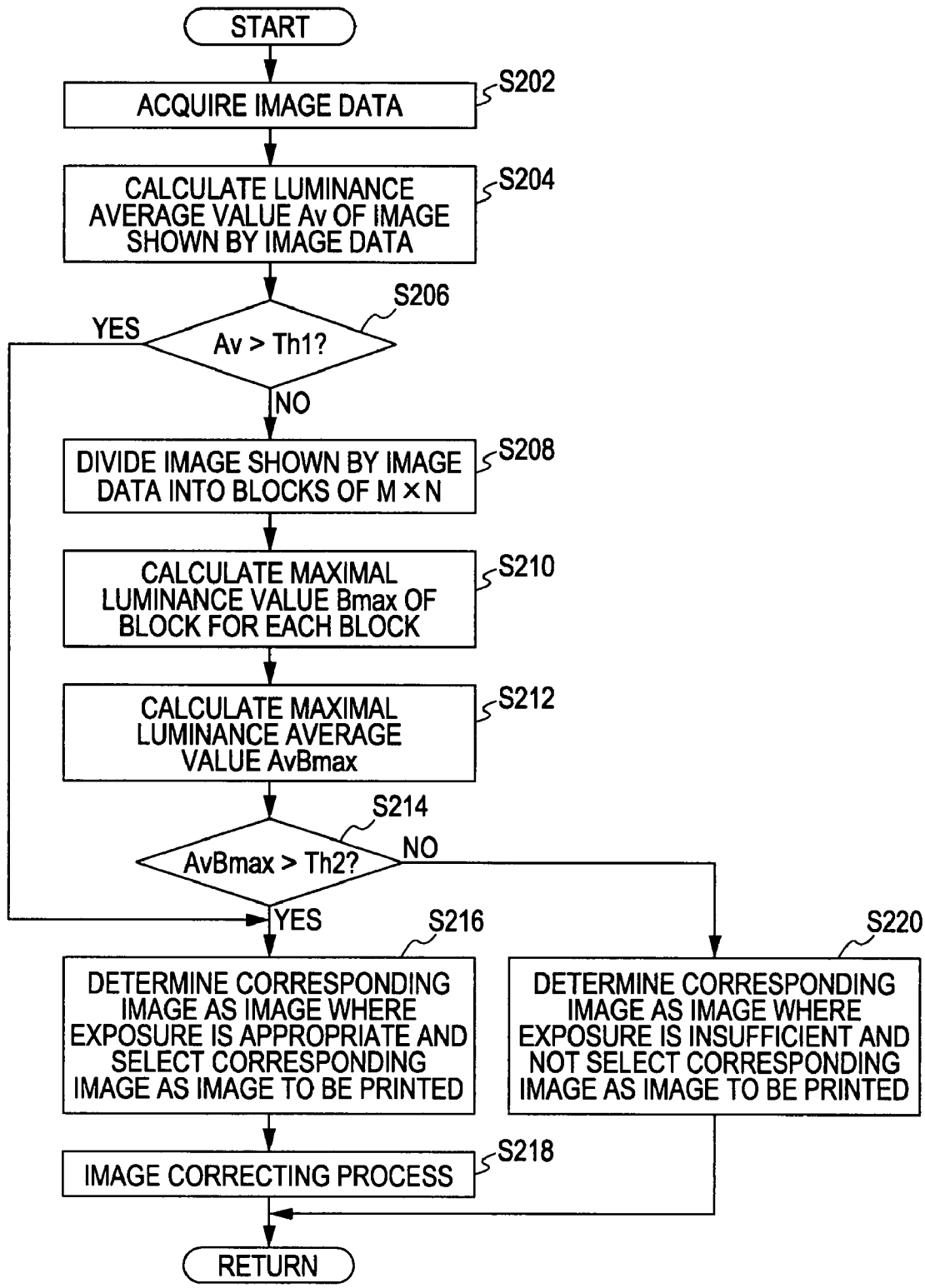
FIG. 8 is a flowchart illustrating a process flow of an exposure determining process routine according to a second embodiment of the invention.

FIG. 8 is a flowchart illustrating a process flow of an exposure determining process routine according to a second embodiment of the invention.

If the user instructs to perform the 'entrusted printing' on all the image data written in the memory card 150a through the operation unit 180, the CPU 110 sequentially executes the exposure determining process routine shown in FIG. 8 for all the image data.

If the exposure determining process routine shown in FIG. 8 starts, first, the maximum average value calculating unit 113 that is controlled by the CPU 110 accesses the memory card 150a through the memory card slot 150, reads and acquires image data representing one image from among image data representing a plurality of images written in the memory card 150a, and writes the read image data in the RAM 120 (Step S202). Then, on the basis of the image data, the average luminance value calculating unit 113 calculates an average value of luminance values of each image, and thus calculates an average luminance value Av of the image (Step S204).

Then, as the first determining step, the exposure determining unit 114 determines whether the calculated average luminance value Av exceeds a predetermined threshold value Th1 (Step S206). At this time, when it is determined that the calculated average luminance value Av exceeds the predetermined threshold value Th1, the exposure determining unit 114 determines the image as an image where exposure is appropriate, and selects the image as an image to be printed (Step S216).

In contrast, when it is determined that the calculated average luminance value Av does not exceed the predetermined threshold value Th1, the maximum average luminance value calculating unit 112 performs the same processes as in Steps S104 to S108 shown in FIG. 2. That is, the maximum average luminance value calculating unit 112 divides an image into M×N blocks (Step S208). Then, on the basis of the image data, the maximum average luminance value calculating unit 112 calculates a maximum luminance value Bmax in each block from luminance values of pixels constituting each block (Step S210). Then, from the maximum luminance values Bmax having been calculated in the above-described manner, the maximum average luminance value AvBmax is calculated (Step S218).

Then, as the second determining step, the exposure determining unit 114 determines that the calculated maximum average luminance value AvBmax exceeds a predetermined threshold value Th2 (Step S214). At this time, when it is determined that the calculated maximum average luminance value AvBmax exceeds a predetermined threshold value Th2, the exposure determining unit 114 determines the image as an image where exposure is appropriate and selects the image as an image to be printed (Step S216). The image correcting unit 116 performs an image correcting process including various image quality corrections on the image selected as the image to be printed in Step S216 (Step S218), and completes the exposure determining process routine.

In contrast, when it is determined that the calculated maximum average luminance value AvBmax does not exceed a predetermined threshold value Th2, the exposure determining unit 114 determines the image as an image where exposure is insufficient and does not select the image as the image to be printed (Step S220), and completes the exposure determining process routine.

In this way, the CPU 110 sequentially executes the exposure determining process routine shown in FIG. 8 for all the image data written in the memory card 150a, discriminates images represented by image data into an image to be printed and an image not to be printed according to whether the image is an image where exposure is appropriate or an image where exposure is insufficient, and executes a predetermined image correcting process on the image to be printed. Then, the printing control unit 118 controls the printer unit 190 and allows the printer unit 190 to sequentially print the images to be printed, having been subjected to an image correcting process.

As described above, images, which are suitable for printing and whose exposure is appropriate, are automatically selected from among a plurality of images written in the memory card 150a, and the selected images can be printed.

Effect of Embodiment

Figure 9:
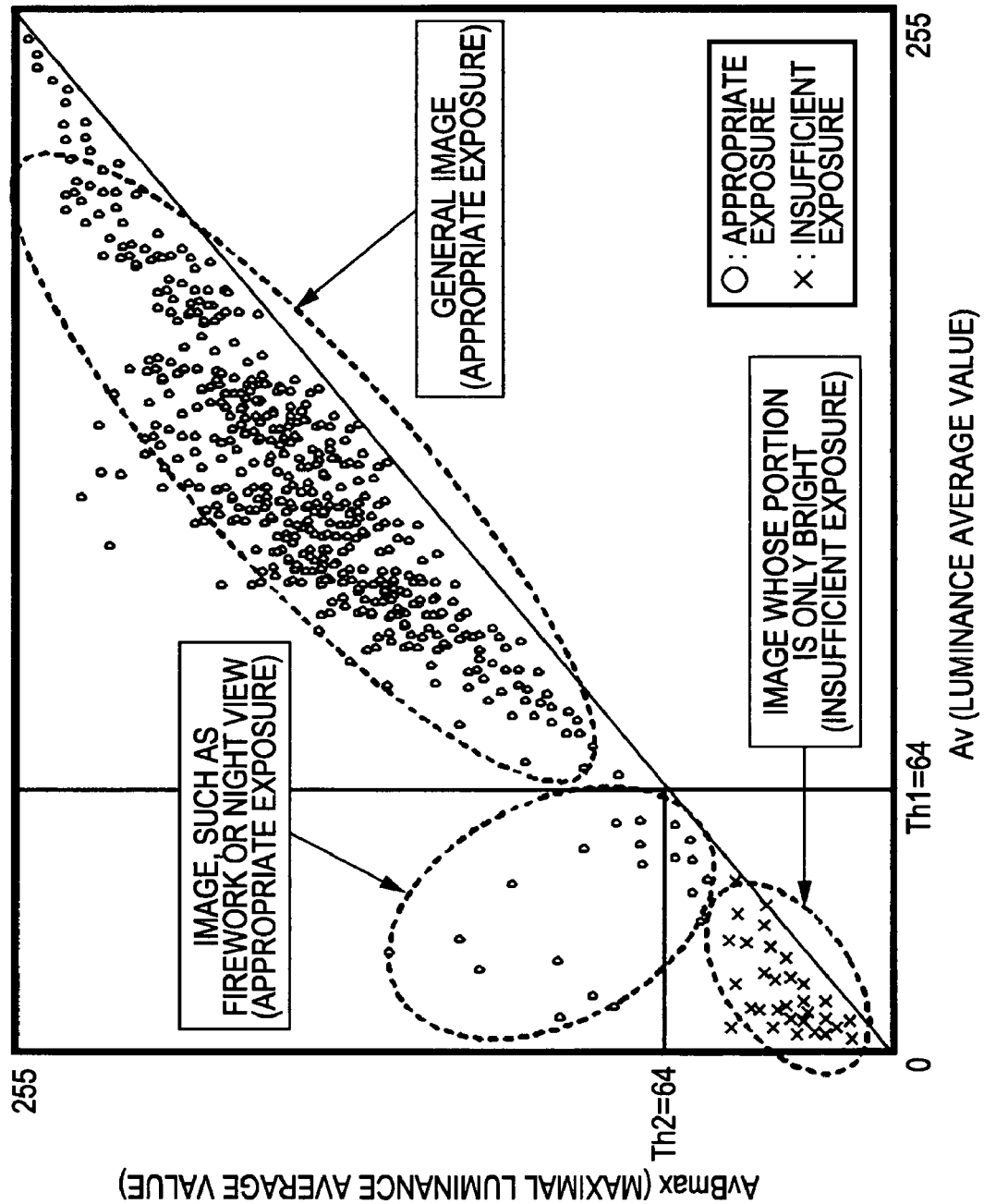
FIG. 9 is a graph a graph illustrating a distribution of an average luminance value and a maximum average luminance value for a plurality of images together with a threshold value for an average luminance value and a threshold value for a maximum average luminance value.

FIG. 9 is a graph illustrating a distribution of an average luminance value and a maximum average luminance value for a plurality of images together with a threshold value for an average luminance value and a threshold value for a maximum average luminance value. In FIG. 9, in regards to targets indicated by a horizontal axis and a longitudinal axis, a range of obtained values, a distribution state of each image, targets indicated by ○ and x, and a group of each image, the description thereof is the same as that shown in FIGS. 5 and 6. Therefore, the repetitive description will be omitted.

Most of images are normal images, and constitute groups of images that are located at the central side and the upper right side, as shown in FIG. 9. Meanwhile, in the first determining step, the average luminance value Av in the image is used as an exposure determining index. For example, as shown in FIG. 9, if a threshold value Th1 with respect to the average luminance value Av is set to '64', most of images are determined as images where exposure is appropriate, in the first determining step. As a result, with respect to most of images, processes that are related to block division, derivation of a maximum luminance value for each block, calculation of a maximum average luminance value (Steps S208 to S212 in FIG. 8), or the like become unnecessary. Accordingly, it is possible to drastically shorten the processing time as a whole.

Further, in the second determining step, the maximum average luminance value AvBmax in the image is used as an exposure determining index. For example, as shown in FIG. 9, if a threshold value Th2 with respect to the maximum average luminance value AvBmax is set to '64', even though the image is determined that exposure is insufficient in the first determining step, it is possible to determine the images of the firework or night view as images where exposure is appropriate, in the second determining step. Further, it is possible to determine all of images whose portion is only bright as images where exposure is insufficient.

As described above, according to this embodiment, first, as the first determining step, the average luminance value Av in the image is used as an exposure determining index, and thus it is possible to drastically shorten the processing time as a whole. With respect to the image determined that exposure is insufficient, as the second determining step, the maximum average luminance value AvBmax in the image is used as an exposure determining index, thereby enabling whether exposure of an image is appropriate to be reliably determined.

Third Embodiment

Structure of Embodiment

A structure of a multifunction machine that includes an exposure determining device according to a third embodiment of the invention is the same as the structure of the multifunction machine 20 shown in FIG. 7. Therefore, the repetitive description will be omitted.

Operation of Embodiment

The operation of this embodiment will be described for a case where a user instructs the multifunction machine 20 shown in FIG. 7 to perform 'entrusted printing' of all the image data written in the memory card 150a, similar to the cases of the first and second embodiments.

The operation of the third embodiment is different from the operation of the second embodiment in that an exposure determining process is performed while a threshold value function formula using the average luminance value Av and the maximum average luminance value AvBmax as variables is used as an exposure determining index.

Figure 10:
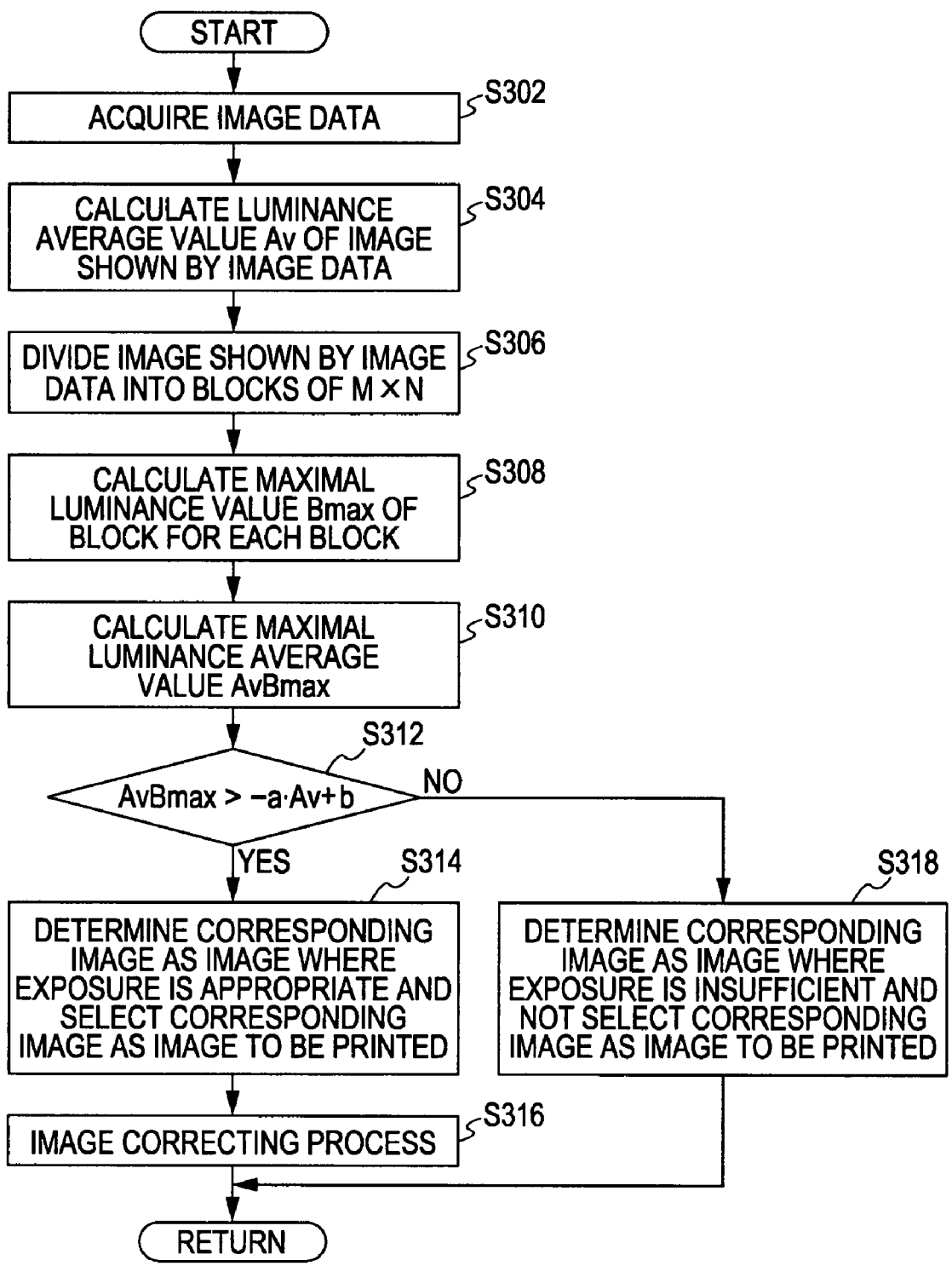
FIG. 10 is a flowchart illustrating a process flow of an exposure determining process routine according to a third embodiment of the invention.

FIG. 10 is a flowchart illustrating a process flow of an exposure determining process routine according to a third embodiment of the invention.

If the user instructs to perform the 'entrusted printing' on all the image data written in the memory card 150a through the operation unit 180, the CPU 110 sequentially executes the exposure determining process routine shown in FIG. 10 for all the image data.

If the exposure determining process routine shown in FIG. 10 starts, first, the average luminance value calculating unit 113 performs the same processes as in Steps S202 and S204 shown in FIG. 8. That is, the average luminance value calculating unit 113 accesses the memory card 150a, reads and acquires image data representing one image from among image data representing a plurality of images written in the memory card 150a, and writes the read image data in the RAM 120 (Step S302). Then, on the basis of the image data, the average luminance value calculating unit 113 calculates an average value of luminance values of each image, and thus calculates an average luminance value Av of the image (Step S304).

Then, the maximum average luminance value calculating unit 112 performs the same processes as in Steps S104 to S108 shown in FIG. 2. That is, the maximum average luminance value calculating unit 112 divides an image into M×N blocks (Step S306). Then, the maximum average luminance value calculating unit 112 calculates a maximum luminance value Bmax in each block on the basis of the image data (Step S308). Then, from the maximum average luminance values Bmax calculated in the above-described manner, the maximum average luminance value AvBmax is calculated (Step S310).

Then, the exposure determining unit 114 determines whether the calculated average luminance value Av and the calculated maximum average luminance value AvBmax satisfy the threshold value function formula represented by Equation 2 (Step S312).

$$AvBmax > -a \cdot Av + b \tag{2}$$

In this case, each of reference characters a and b indicates a positive constant number.

When it is determined that the calculated average luminance value Av and the calculated maximum average luminance value AvBmax satisfy the threshold value function formula, the exposure determining unit 114 determines the image as an image where exposure is appropriate and selects the image as an image to be printed (Step S314). The image correcting unit 116 performs an image correcting process including various image quality corrections on the image selected as the image to be printed (Step S316), and completes the exposure determining process routine.

In contrast, when it is determined that the calculated average luminance value Av and the calculated maximum average luminance value AvBmax do not satisfy the threshold value function formula, the exposure determining unit 114 determines the image as an image where exposure is insufficient and does not select the image as the image to be printed (Step S318), and completes the exposure determining process routine.

In this way, the CPU 110 sequentially executes the exposure determining process routine shown in FIG. 10 for all the image data written in the memory card 150a, discriminates images represented by image data into an image to be printed and an image not to be printed according to whether the image is an image where exposure is appropriate or an image where exposure is insufficient, and executes a predetermined image correcting process on the image to be printed. Then, the printing control unit 118 controls the printer unit 190 and allows the printer unit 190 to sequentially print the images to be printed, having been subjected to an image correcting process.

As described above, images, which are suitable for printing and whose exposure is appropriate, are automatically selected from a plurality of images written in the memory card 150*a*, and the selected images can be printed.

Effect of Embodiment

Figure 11:
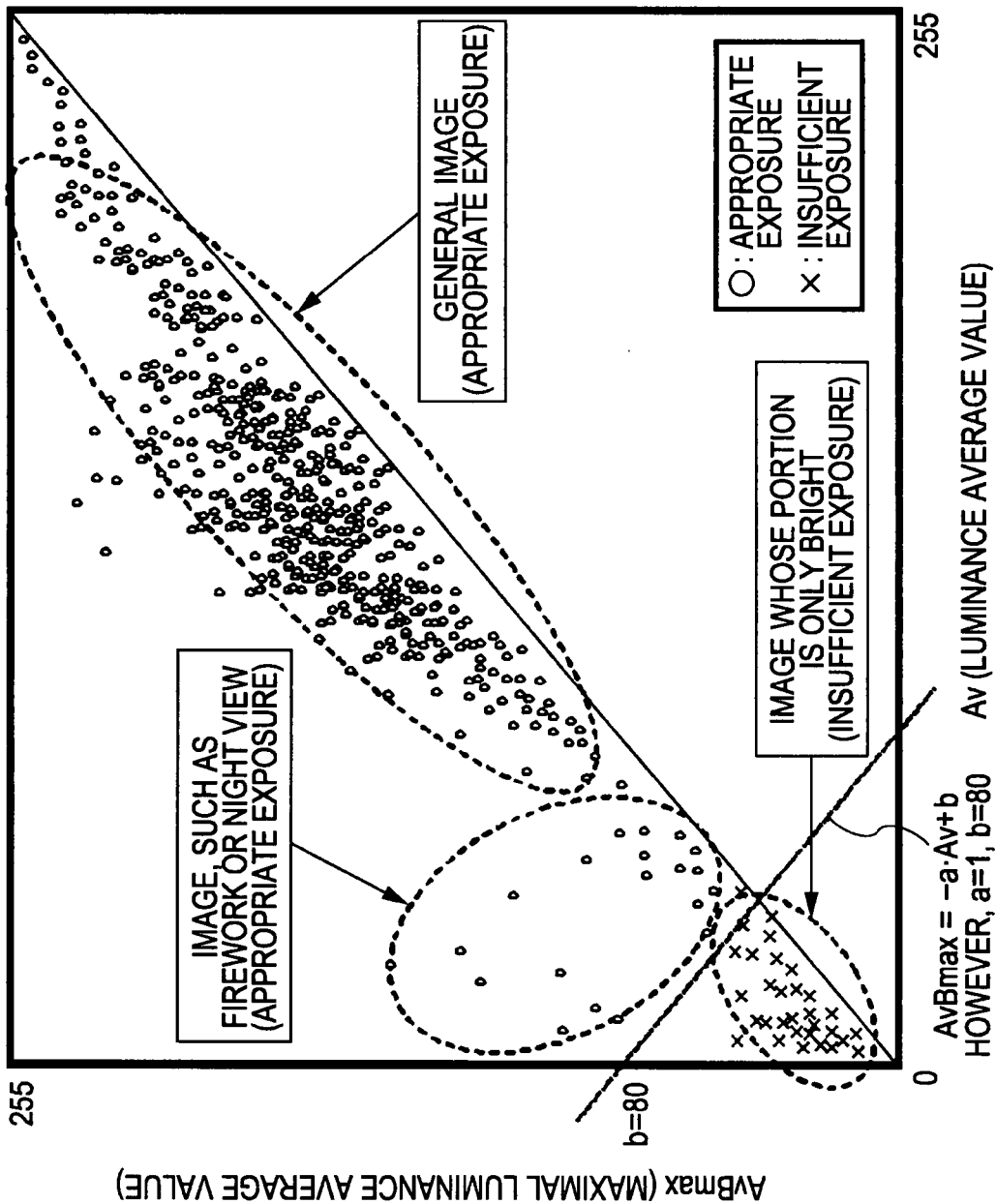
FIG. 11 is a graph illustrating a distribution of an average luminance value and a maximum average luminance value for a plurality of images together with a threshold value function formula.

FIG. 11 is a graph illustrating a distribution of an average luminance value and a maximum average luminance value for a plurality of images together with a threshold value function formula. In FIG. 11, in regards to targets indicated by a horizontal axis and a longitudinal axis, a range of obtained values, a distribution state of each image, targets indicated by ○ and x, and a group of each image, the description thereof is the same as those shown in FIGS. 5, 6, and 9. Therefore, the repetitive description will be omitted.

In this embodiment, as described above, the threshold value function formula represented by Equation 2 is used as an exposure determining index. For example, as shown in FIG. 11, if a constant number a is set to '1' and a constant number b is set to '80', all the images that are located at the upper right side on the basis of a straight line AvBmax=−Av+80 are determined as images where exposure is appropriate, and all the images that are located at the lower left side on the basis of the straight line AvBmax=−Av+80 are determined as images where exposure is insufficient. As a result, it is possible to determine that all of the images including the image of the firework or night view as well as the normal images are images where exposure is appropriate. Further, it is possible to determine that all of images where only one portion is bright are images where exposure is insufficient.

As described above, according to this embodiment, the threshold value function formula using the average luminance value Av and the maximum average luminance value AvBmax as variables is used as the exposure determining index, and thus it is possible to determine whether that exposure of the image is appropriate, with high precision.

Fourth Embodiment

Structure of Embodiment

A structure of a multifunction machine that includes an exposure determining device according to a fourth embodiment of the invention is the same as the structure of the multifunction machine 10 according to the first embodiment of the invention shown in FIG. 1. Therefore, the repetitive description will be omitted.

Operation of Embodiment

The operation of this embodiment will be described for a case where a user instructs the multifunction machine 10 shown in FIG. 1 to perform 'entrusted printing' of all the image data written in the memory card 150*a*, similar to the cases of the first to third embodiments.

The operation of the fourth embodiment is different from the operation of the second embodiment in that an exposure determining process is performed by using the exposure determined result performed by the image correcting unit in the first determining step.

Before describing an exposure determining process routine according to this embodiment, a normal image correcting process will be described with reference to FIG. 12.

Figure 12:
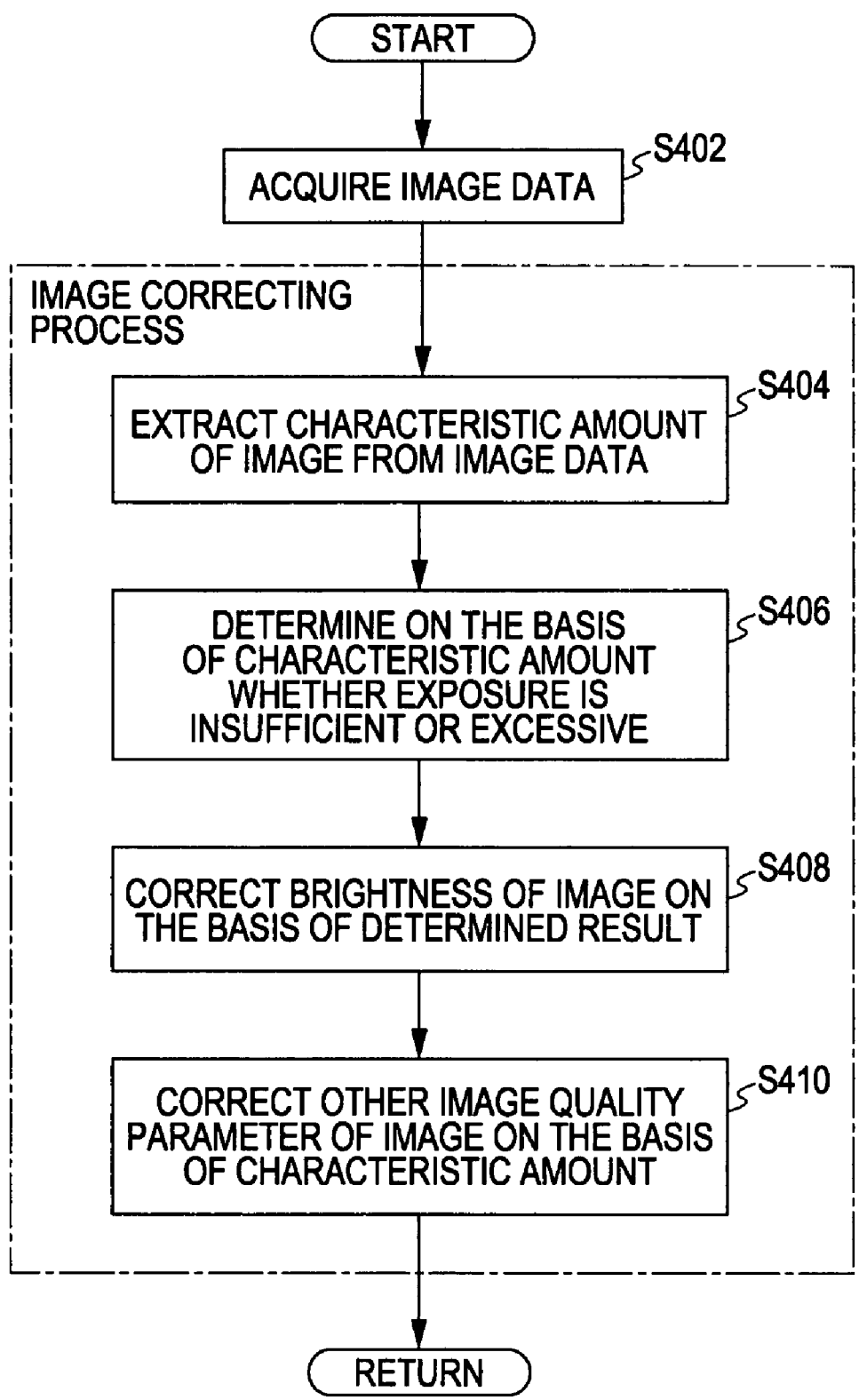
FIG. 12 is a flowchart illustrating a process flow of a normal image correcting process routine.

FIG. 12 is a flowchart illustrating a process flow of a normal image correcting process routine.

If the image correcting process routine shown in FIG. 12 starts, first, the image correcting unit accesses the memory card, reads and acquires image data representing one image from among image data representing a plurality of images written in the memory card, and writes the read image data in the RAM (Step S402). Then, a characteristic value of an image used at the time of an image correcting process is extracted from the image data (Step S404). Examples of the characteristic value include a range width, an accumulated histogram, and an average value for luminance values.

The image correcting unit determines on the basis of the extracted characteristic value whether exposure of the image is insufficient or excessive (Step S406), and corrects the brightness of the image on the basis of the determined result (Step S408). Further, the image correcting unit corrects image quality parameters other than the brightness on the image on the basis of the extracted characteristic value, and completes a series of image correcting processes.

This is the normal image correcting process. Meanwhile, in this embodiment, as described above, the image correcting unit performs an exposure determination on the basis of the determined result obtained through Step S406.

Figure 13:
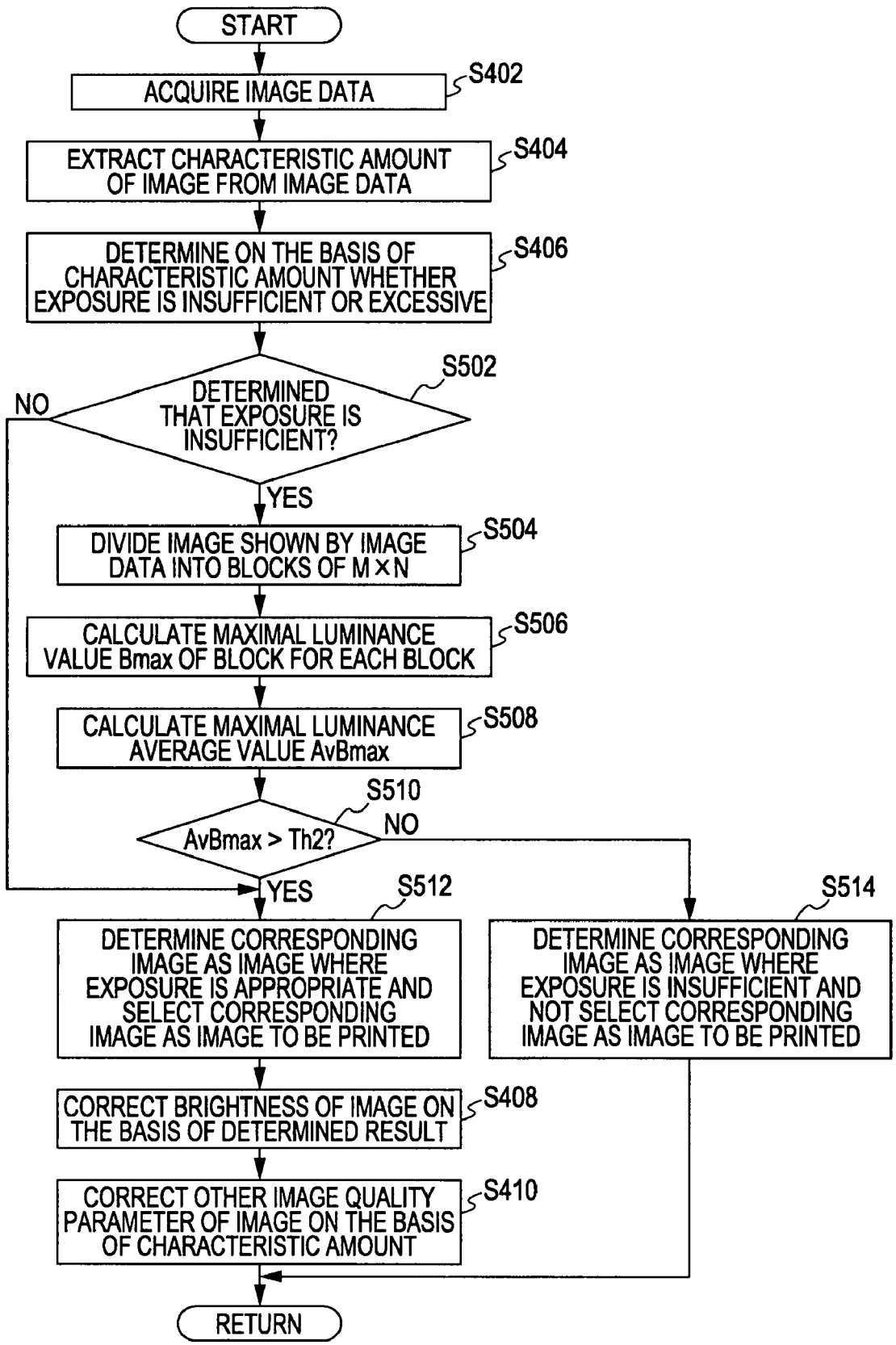
FIG. 13 is a flowchart illustrating a process flow of an exposure determining process routine according to a fourth embodiment of the invention.

FIG. 13 is a flowchart illustrating a process flow of an exposure determining process routine according to a fourth embodiment of the invention. As apparent from the comparison between FIGS. 13 and 12, the exposure determining process routine according to the this embodiment is obtained by dividing the image correcting process shown in FIG. 12 into the first half and the second half on the basis of Steps S406 and S408, and adding new Steps S502 to S514 between the first half and the second half.

Accordingly, if a user instructs the multifunction machine 20 shown in FIG. 7 to perform 'entrusted printing' of all the image data written in the memory card 150*a* through the operation unit 180, the CPU 110 executes the exposure determining process routine shown in FIG. 13 sequentially with respect to the respective image data.

If the exposure determining process routine shown in FIG. 13 starts, first, the image correcting unit 116 performs the processes in Steps S402 to S406 of the first half shown in FIG. 12. That is, the image correcting unit 116 accesses the memory card 150*a*, reads and acquires image data representing one image from among image data representing a plurality of images written in the memory card 150*a*, and writes the read image data in the RAM 120 (Step S402). Then, on the basis of the image data, the image correcting unit 116 extracts the characteristic value of the image (Step S404), and determines on the basis of the extracted characteristic value whether exposure of the image is insufficient or excessive (Step S406).

Then, as the first determining step, the exposure determining unit 114 determines whether it is determined by the image correcting unit 116 that exposure of the image is insufficient (Step S502). When it is determined by the image correcting unit 116 that exposure of the image is sufficient, the exposure determining unit 14 determines the image as an image where exposure is appropriate and selects the image as an image to be printed (Step S512).

In contrast, when it is determined by the image correcting unit 116 that exposure of the image is insufficient, the maximum average luminance value calculating unit 112 performs the same processes as in Steps S104 to S108 shown in FIG. 2. That is, the maximum average luminance value calculating unit 112 divides the image into M×N blocks (Step S504). Then, on the basis of the image data, the maximum average luminance value calculating unit 112 calculates a maximum luminance value Bmax in each from luminance values of pixels constituting each block (Step S506). Then, from the maximum luminance values Bmax calculated in the above-described manner, the maximum average luminance value AvBmax is calculated (Step S508).

Then, as the second determining process, the exposure determining unit 114 determines whether the calculated maximum average luminance value AvBmax exceeds a predetermined threshold value Th2 (Step S510). At this time, when it is determined that the calculated maximum average luminance value AvBmax exceeds a predetermined threshold value Th2, the exposure determining unit 114 determines the image as an image where exposure is appropriate and selects the image as an image to be printed (Step S512). The image correcting unit 116 performs the processes in Steps S408 and S410 of the second half shown in FIG. 12 on the image selected as the image to be printed in Step S512. That is, the image correcting unit 116 corrects the brightness of the image on the basis of the determined result obtained through Step S406 (Step S408), corrects image quality parameters other than the brightness on the image on the basis of the extracted characteristic value, and completes an exposure determining process routine.

In contrast, when it is determined that the calculated maximum average luminance value AvBmax does not exceed a predetermined threshold value Th2, the exposure determining unit 114 determines the image as an image where exposure is insufficient and does not select the image as an image to be printed (Step S514), and completes an exposure determining process routine, In this way, the CPU 110 sequentially executes the exposure determining process routine shown in FIG. 13 for all the image data written in the memory card 150a, discriminates images represented by image data into an image to be printed and an image not to be printed according to whether the image is an image where exposure is appropriate or an image where exposure is insufficient, and executes a predetermined image correction on the image to be printed. Then, the printing control unit 118 controls the printer unit 190 and allows the printer unit 190 to sequentially print the images to be printed, having been subjected to an image correcting process.

As described above, images, which are suitable for printing and whose exposure is appropriate, are automatically selected from a plurality of images written in the memory card 150a, and the selected images can be printed.

Effect of Embodiment

In this embodiment, as described above, in the first exposure determining step, the exposure determination is performed on the basis of the exposure determined result performed by the image correcting unit. As a result, it is not necessary to perform the extraction of the image characteristic value or the determination on where exposure is insufficient. Therefore, it is possible to reduce the number of processes or the number of constituent elements.

As described above, since most of images are normal images, if it is determined on the characteristic value of the image whether exposure is insufficient, most images are not determined as images where exposure is insufficient. Therefore, as the first determining step, the exposure determined result performed by the image correcting unit is used, and thus most images are determined as images where exposure is appropriated. As a result, with respect to most of images, processes that are related to block division, derivation of a maximum luminance value for each block, calculation of a maximum average luminance value (Steps S504 to S508 in FIG. 13), or the like become unnecessary. Accordingly, it is possible to drastically shorten the processing time as a whole.

Further, in the second determining step, the maximum average luminance value AvBmax in the image is used as an exposure determining index. Therefore, even though the image is an image determined that exposure is sufficient in the first determining step, it is possible to determine that the image of the firework or night view is an image where exposure is appropriate, in the second determining step. Further, it is possible to determine that all of images where only one portion thereof is bright are images where exposure is insufficient. Therefore, it is possible to reliably determine whether exposure of an image is appropriate.

Modification

The invention is not limited to the above-described embodiments, and various changes and modifications can be made without departing from the sprit and scope of the invention.

First Modification

In the above-described embodiments, the image to be printed is an exposure determination target. However, when a thumbnail image of the image exists, the thumbnail image may be an exposure determination target. For example, when the image to be printed (hereinafter, referred to as main image) is provided as an Exif file, the thumbnail image exists in the Exif file. Accordingly, when the exposure determination is performed, the exposure determination may be performed by using the thumbnail image instead of the main image. Since the thumbnail image has a size of 160×120 pixels, the image size is extraordinarily as compared with the main image. Therefore, since a load becomes reduced at the time of performing block division, derivation of a maximum luminance value for each block, calculation of a maximum average luminance value, or the like, it is possible to drastically shorten the processing time.

Further, when the thumbnail image does not exist in the Exif file or the image is not provided as the Exif file, the thumbnail image may be created from the main image by using an interpolation process, and an exposure determination may be performed by using the created thumbnail image.

Second Modification

In the above-described embodiments, a format of the image data is not mentioned. However, for example, when an image is a JPEG image that is compressed in a format of JPEG (Joint Photographic Experts Group), the following process may be performed in consideration of a data structure of the JPEG image.

In the JPEG image, a block of 8×8 pixels becomes one process size. Therefore, in the exposure determining process, when calculating a maximum luminance value for each block, the maximum luminance value may be calculated in a unit of a block of 8×8 pixels. In this way, it is possible to omit a process that divides an image into M×N blocks. When the JPEG image is decoded in a unit of a block of 8×8 pixels, the maximum luminance value for each block can be obtained, and an efficient process can be performed.

In the JPEG image, a block of 8×8 pixels is a discrete cosine transform (DCT), and is represented as frequency components of 8×8. Accordingly, in the exposure determining process, when calculating an average luminance value Av of an image, for each block of 8×8 pixels, a DC components of the DCT in the blocks may be calculated, an average value of the DC components may be calculated, and the average value of the DC components may be used as the average luminance value Av of the image. Since the DC component of the DCT in each block is equal to an average value of luminance values of pixels constituting each block, the average value of the DC components may be used as the average luminance value Av of the image, which does not damage the luminance determination precision. For example, the luminance value is in a range of 0 to 256 and the DC component is in a range of −1024 to 1023. By using this method, it is possible to drastically shorten the processing time on the entire image, as compared with a case where an average value of luminance values of pixels is calculated.

In the exposure determining process, when calculating the maximum luminance value Bmax for each block, for each block of 8×8 pixels, the DC component of DCT in each block and an AC component until a third coefficient may be used to calculate the maximum luminance value of each block. Since a high frequency component value is very small in the AC components of the DCT in each block, the high frequency component value is ignored, which does not damage the exposure determination precision. By using this method, the processing time can be drastically reduced, as compared with the case where the maximum luminance value is calculated from among the luminance values of pixels constituting each pixel.

Third Modification

In the above-described second and third embodiments, the average luminance value Av is used in order to perform an exposure determination. The invention is not limited thereto, but another characteristic value of an image may be used. For example, the following characteristics may be used instead of the average luminance value Av. That is, examples of the characteristics include ratio of halation pixels to all pixels: ratio of pixels having a luminance value of 0 for all pixels of an image; ratio of dark pixels to all pixels: ratio of pixels having a luminance value in a range of 0 to I for all pixels of an image (i is a natural number of 1 or more); accumulated histogram: luminance value of a histogram accumulation a % from a dark side or a bright side; ratio of bright pixels to all pixels: ratio of pixels having a luminance value in a range of i to 255 with all pixels of an image (i is a natural number of 1 or more); and standard deviation: standard deviation of luminance values (standard deviation of DC components of DCT in a block of 8×8 pixels in a case of a JPEG image).

Fourth Modification

In the above-described embodiments, the image data written in the memory card 150a is an exposure determination target. However, a digital camera or the like may be connected to a USB interface unit 160, image data written in the digital camera may be an exposure determination target, or image data read by a scanner unit 140 may be an exposure determination target.

Fifth Modification

In the third embodiment, the average luminance value Av and the maximum average luminance value AvBmax are calculated and the exposure determination is performed by using the threshold value function formula represented by Equation 2. However, the exposure determination may be performed by using a lookup table instead of the threshold value function formula.

That is, a lookup table where the average luminance value Av and the maximum average luminance value AvBmax are input and the determined result is output is prepared, the average luminance value Av and the maximum average luminance value AvBmax having been calculated are input to the lookup table, and the determined result according to a combination of the input values is obtained from the lookup table.

Sixth Modification

In the above-described embodiments, the description is given of the case where the invention is applied to the 'entrusted printing', but the invention may be applied to 'assist printing'. That is, at the time of the 'entrusted printing', with respect to the images determined by the exposure determination process as the images where exposure is insufficient, the images are not selected as the images to be printed, and the images are not printed. Meanwhile, at the time of the 'assist printing', before performing printing, the images determined by the exposure determination process as the images where exposure is appropriate are only set to printed candidates, the images are displayed non a liquid crystal display 170, and are selected by a user. Alternatively, the exposure determined result may be displayed to determine whether which images are suitable for printing.

Seventh Modification

In the above-described embodiments, when performing an exposure determination of an image, it is determined whether exposure of an image is appropriate or whether exposure of an image is insufficient. However, it may be determined whether exposure of an image is appropriate or whether exposure of an image is excessive. For example, in order to achieve this, the same exposure determining process is performed in a state where luminance values of pixels are inversed (that is, a luminance value 0 is replaced by 255 and a luminance value 255 is replaced by 0).

Eighth Modification

In the above-described embodiments, in the exposure determining process, the maximum luminance values Bmax for the individual blocks are calculated, an average value of the maximum luminance values Bmax for the individual blocks are calculated, and the maximum average luminance value AvBmax is calculated. However, the invention is not limited thereto. For example, when the image is provided as the Exif file, information, which is associated with photometry of when being imaged, may be written in the Exif file. In this case, after obtaining the information associated with the photometry, a weighting value may be added to the maximum luminance value Bmax for each block according to the obtained photometry, and thus an average value may be calculated.

FIGS. 14A and 14B are diagrams illustrating examples of photometry. Specifically, FIG. 14A is a diagram illustrating an example of evaluation photometry and FIG. 14B is a diagram illustrating an example of centrally weighted photometry. In FIGS. 14A and 14B, each rectangle indicates each block of an image. FIGS. 14A and 14B show examples of when an image is divided into 5×5 blocks. In FIGS. 14A and 14B, a numerical value in each rectangle indicates a weighting value.

As such, when the information associated with the photometry can be obtained from the Exif file, the weighting value may be used as a weighting function W (i, j). Accordingly, the maximum average luminance value W_AvBmax that has been added to a weighting value is calculated by Equation 3

$$W\_AvBmax = \frac{\sum_{i=1,j=1}^{5,5} \{Bmax(i,j) \times W(i,j)\}}{\sum_{i=1,j=1}^{5,5} W(i,j)}. \quad (3)$$

Further, when the information associated with the photometry cannot be obtained from the Exif file, the same calculation may be performed by using an independent weighting function.

Further, even in the case where an average luminance value of an image is calculated as well as the case where the maximum average luminance value is calculated, the same weighting function may be used.

Ninth Modification

In the above-described embodiments, in the exposure determining process, the maximum luminance value Bmax for each block is used. However, the invention is not limited thereto. That is, not only the maximum luminance value but also a value proportional to the maximum luminance value may be used. For example, the n-th larger value from among luminance values of pixels constituting each block may be used. Further, a value of a histogram accumulation m % from a lager side may be used.

Tenth Modification

In the above-described embodiments, a range where the luminance values of the pixel are obtained is set to a range of 0 to 255, but the invention is not limited thereto. That is, a range wider than the above-described range or a range narrower than the above-described range may be used.

Eleventh Modification

In the above-described embodiments, the description is given of the case where the exposure determining device according to the embodiments of the invention is applied to the multifunction machine. The exposure determining device according to the embodiments of the invention may be applied to the various devices including a printer, a digital camera, an image viewer, a scanner, a projector, or the like, or may be applied to a computer.

The entire disclosure of Japanese Patent Application Nos: 2006-43719, filed Feb. 21, 2006 and 2006-309406, filed Nov. 15, 2006 are expressly incorporated by reference herein.

What is claimed is:

1. An exposure determining device that determines whether exposure of an image represented by image data is appropriate, the exposure determining device comprising:
a first evaluation value deriving unit that divides the image into a plurality of blocks of the image data, derives a maximum luminance reference value for each block on the basis of luminance values of pixels constituting each block, and derives a first evaluation value for the image on the basis of the derived maximum luminance reference values for the blocks;
a second evaluation value deriving unit that derives a characteristic value of the image as a second evaluation value for the image on the basis of the image data; and
an exposure determining unit that determines whether exposure of the image is appropriate, on the basis of the derived first evaluation value and the derived second evaluation value.

2. The exposure determining device according to claim 1, wherein the first evaluation value for the image is an average value of the maximum luminance reference values for the individual blocks, and
the exposure determining unit determines that exposure of the image is appropriate, when the first evaluation value exceeds a first threshold value.

3. The exposure determining device according to claim 1, wherein the exposure determining unit determines whether exposure of the image is appropriate, on the basis of the derived second evaluation values as a first determining step, and determines whether exposure of the image is appropriate, on the basis of the derived first evaluation value, as a second determining step, when it is determined in the first determining step that exposure of the image is not appropriate, and
the first evaluation value deriving unit performs derivation of the first evaluation value on the basis of the image data, when it is determined by the exposure determining unit in the first determining step that exposure of the image is not appropriate.

4. The exposure determining device according to claim 1, wherein the first evaluation value for the image is an average value of the maximum luminance reference values for the individual blocks,
the characteristic value of the image is an average value of luminance values of pixels that constitute the image, and
the exposure determining unit determines that exposure of the image is appropriate when it is determined in the first determining step that the second evaluation value exceeds a second threshold value, determines that exposure of the image is not appropriate when it is determined in the first determining step that the second evaluation does not exceed the second threshold value, and determines that exposure of the image is appropriate when it is determined in the second determining step that the first evaluation value exceeds a first threshold value.

5. The exposure determining device according to claim 1, wherein the exposure determining unit determines whether exposure of the image is appropriate, on the basis of a threshold value function formula using first and second evaluation values as variables.

6. The exposure determining device according to claim 5, wherein the first evaluation value for the image is an average value of the maximum luminance reference values for the individual blocks,
the characteristic value of the image is an average value of luminance values of pixels that constitute the image,
when the average value of the maximum luminance reference values for the individual blocks is defined as AvRmax, the average value of the luminance values of pixels is defined as Av, and constant numbers are defined as a and b (a and b being positive numbers), the threshold value function formula is represented by Equation AvRmax>−a·Av+b, and
when the threshold value function formula is satisfied, it is determined that exposure of the image is appropriate.

7. The exposure determining device according to claim 2, wherein the average value of the maximum luminance reference values for the individual blocks is an average value of values that are obtained by weighting the maximum luminance reference values for the individual blocks.

8. The exposure determining device according to claim 7, wherein when the image is an image that has been captured using predetermined photometry, weighting values for the individual blocks are set according to the predetermined photometry.

9. The exposure determining device according to claim 4, wherein when the image is a JPEG image that is an image compressed in a JPEG format, the average value of the luminance values of pixels is calculated as an average value of discrete cosine components of a discrete cosine transform that is obtained for each block of 8×8 pixels constituting the JPEG image.

10. The exposure determining device according to claim 1, wherein the maximum luminance reference value for each block is a maximum luminance value from among the luminance values of pixels that constitute the block.

11. The exposure determining device according to claim 1, wherein when a thumbnail image for the image exists, it is determined whether exposure of the thumbnail image is appropriate, by using the thumbnail image instead of the image, and
when it is determined that exposure of the thumbnail image is appropriate, it is also determined that exposure of the image is appropriate.

12. An exposure determining method that determines whether exposure of an image represented by image data is appropriate, the exposure determining method comprising:
dividing the image into a plurality of blocks of the image data;
deriving a maximum luminance reference value for each block on the basis of luminance values of pixels constituting each block, and deriving a first evaluation value for the image on the basis of the derived maximum luminance reference values for the blocks;
deriving a characteristic value of the image as a second evaluation value for the image on the basis of the image data; and
determining whether exposure of the image is appropriate, on the basis of the derived first evaluation value and the derived second evaluation value.

13. The exposure determining method according to claim 12, wherein the maximum luminance reference value for each block is a maximum luminance value from among luminance values of pixels that constitute each block.

14. A non-transitory computer-readable storage medium with a program stored thereon, wherein the program instructs a computer to determine whether exposure of an image represented by image data is appropriate by:
dividing the image into a plurality of blocks of the image data;
deriving a maximum luminance reference value for each block on the basis of luminance values of pixels constituting each block, and deriving a first evaluation value for the image on the basis of the derived maximum luminance reference values for the blocks;
deriving a characteristic value of the image as a second evaluation value for the image on the basis of the image data; and
determining whether exposure of the image is appropriate, on the basis of the derived first evaluation value and the derived second evaluation value.

15. The storage medium according to claim 14, wherein the maximum luminance reference value for each block is a maximum luminance value from among luminance values of pixels that constitute each block.

* * * * *